(12) United States Patent
Ogawa

(10) Patent No.: US 10,725,874 B2
(45) Date of Patent: Jul. 28, 2020

(54) STORAGE SYSTEM AND CONNECTION CONTROL DEVICE

(71) Applicant: FUJITSU LIMITED, Kawasaki-shi, Kanagawa (JP)

(72) Inventor: Junichi Ogawa, Tachikawa (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 16/059,090

(22) Filed: Aug. 9, 2018

(65) Prior Publication Data

US 2019/0057003 A1 Feb. 21, 2019

(30) Foreign Application Priority Data

Aug. 16, 2017 (JP) .................................. 2017-157119

(51) Int. Cl.
*G06F 11/20* (2006.01)
*G06F 3/06* (2006.01)

(52) U.S. Cl.
CPC ............ *G06F 11/201* (2013.01); *G06F 3/067* (2013.01); *G06F 3/0607* (2013.01); *G06F 3/0617* (2013.01); *G06F 3/0635* (2013.01); *G06F 11/2089* (2013.01)

(58) Field of Classification Search
CPC ...... G06F 3/067; G06F 3/0607; G06F 11/201; G06F 11/2089
See application file for complete search history.

(56) References Cited

FOREIGN PATENT DOCUMENTS

| JP | 2009-157859 | 7/2009 |
|---|---|---|
| WO | 2012/032607 | 3/2012 |

*Primary Examiner* — Getente A Yimer
(74) *Attorney, Agent, or Firm* — Fujitsu Patent Center

(57) ABSTRACT

A second connection control device includes a processor. The processor receives a reception notification that notifies that a first connection control device has received a first connection request from a first main control device. The first connection request requests to establish a first connection with a first storage device via a first communication route through the first connection control device. The processor transmits a third connection request to the first storage device upon receiving the reception notification. The third connection request requests to establish a third connection with the first storage device. The processor transmits a success notification to the first main control device upon receiving a second connection request after the third connection is established. The success notification indicates that a second connection is established. The second connection request requests to establish the second connection with the first storage device via a second communication route.

9 Claims, 14 Drawing Sheets

STORAGE SYSTEM AND CONNECTION CONTROL DEVICE

CROSS-REFERENCE TO RELATED APPLICATION

This application is based upon and claims the benefit of priority of the prior Japanese Patent Application No. 2017-157119, filed on Aug. 16, 2017, the entire contents of which are incorporated herein by reference.

FIELD

The embodiments discussed herein are related to a storage system and a connection control device.

BACKGROUND

Currently, a storage system having a storage device and a control device for controlling an access to the storage device has been widely distributed. In such a storage system, a fault tolerance may be improved by making a communication route from the control device to the storage device to be redundant. As such a system, for example, a storage system having a communication route passing through a first relay device and a communication route passing through a second relay device has been proposed.

In the storage system, the control device may be made redundant. In such a system, for example, a storage system is proposed in which when one control device detects that an abnormality has occurred in a first route to a disk, the one control device communicates with the other control device to allow the one control device to access the disk by using a second route to the disk based on a result of the communication.

Related technologies are disclosed in, for example, International Publication Pamphlet No. WO 2012/032607 and Japanese Laid-Open Patent Publication No. 2009-157859.

SUMMARY

According to an aspect of the present invention, provided is a second connection control device including a switch, a communication interface, and a processor. The switch is configured to relay data transmitted between a first storage device and a first main control device via a second communication route. The communication interface is configured to communicate with a first connection control device that is configured to relay data transmitted between the first storage device and the first main control device via a first communication route different from the second communication route. The processor is configured to receive a reception notification via the communication interface. The reception notification notifies that the first connection control device has received a first connection request from the first main control device. The first connection request requests to establish a first connection with the first storage device via the first communication route through the first connection control device. The processor is configured to transmit a third connection request to the first storage device via the switch upon receiving the reception notification. The third connection request requests to establish a third connection with the first storage device. The processor is configured to transmit a success notification to the first main control device via the switch upon receiving a second connection request after the third connection is established. The success notification indicates that a second connection is established. The second connection request requests to establish the second connection with the first storage device via the second communication route. The processor is configured to transfer an input/output request to the first storage device via the switch upon receiving the input/output request. The input/output request is transmitted from the first main control device in response to reception of the success notification and requesting input or output of data to the first storage device.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the storage system in which the communication route is made redundant as described above, for example, the following operation is performed. The control device requests connection with the storage device via a first communication route. Herein, when an abnormality occurs in the first communication route and the connection with the storage device is unsuccessful, the control device requests the connection with the storage device via a second communication route. When the connection is successful, the control device transmits an input/output request to the storage device through the second communication route.

However, in such an operation, since the control device fails to make a connection on the first communication route and then requests a connection again via the second communication route, it takes a long waiting time until the control device may transmit the input/output request. As a result, there is a problem that access performance is greatly degraded as compared with the case where the control device succeeds in the connection with the first communication route and thus transmits the input/output request via the first communication route.

Hereinafter, embodiments of the present disclosure will be described with reference to the accompanying drawings.

First Embodiment

Figure 1:
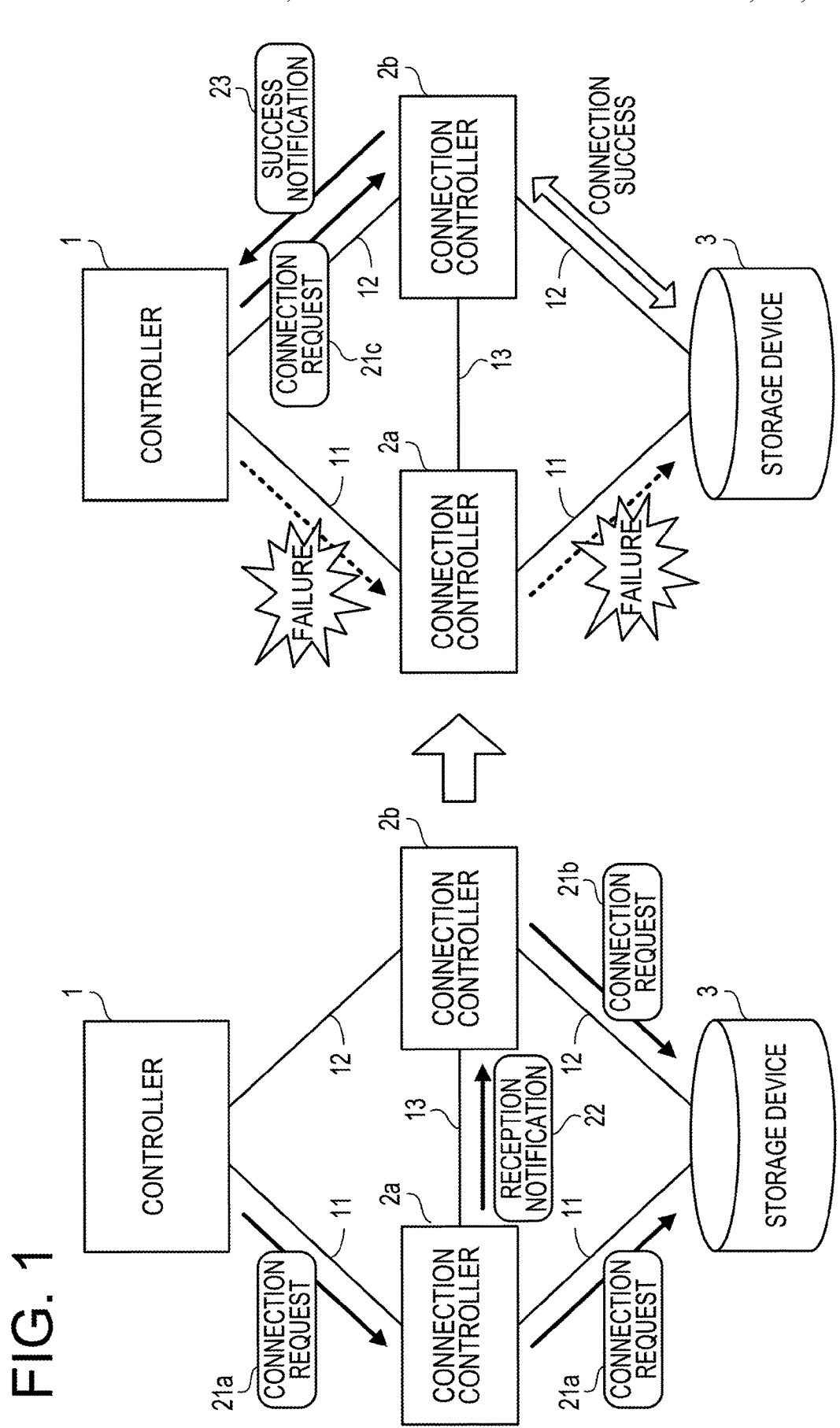
FIG. 1 is a diagram illustrating a configuration example and an operation example of a storage system according to a first embodiment.

FIG. 1 is a diagram illustrating a configuration example and an operation example of a storage system according to a first embodiment. The storage system illustrated in FIG. 1 includes a control device 1, connection control devices 2a and 2b, and a storage device 3.

The control device 1 accesses the storage device 3. The control device 1 may access the storage device 3 via a communication route 11 which passes through the connection control device 2a. The control device 1 may also access the storage device 3 via a communication route 12 which passes through the connection control device 2b.

The connection control device 2a relays data transmitted and received via the communication route 11. The connection control device 2b relays data transmitted and received via the communication route 12. Further, the connection control device 2a and the connection control device 2b are configured to communicate with each other. In the example of FIG. 1, the connection control device 2a and the connection control device 2b are configured to communicate via a communication route 13 which is independent from the communication routes 11 and 12.

The storage device 3 is an access target from the control device 1 and is implemented as, for example, a hard disk drive (HDD), a solid state drive (SSD), and the like.

Next, a processing when the control device 1 accesses the storage device 3 will be described.

When accessing the storage device 3, the control device 1 first transmits a connection request to the storage device 3. When the connection with the storage device 3 is established by the connection request, the control device 1 may transmit an input/output request to the storage device 3 via a communication route in which the connection is established. Hereinafter, a detailed processing example will be described.

As illustrated on a left side of FIG. 1, the control device 1 first transmits a connection request 21a which requests the connection with the storage device 3 via the communication route 11. Upon receiving the connection request 21a, the connection control device 2a transmits the connection request 21a to the storage device 3 and transmits a reception notification 22 indicating that the connection request 21a is received to the connection control device 2b. Upon receiving the reception notification 22, the connection control device 2b transmits a connection request 21b which requests the connection with the storage device 3 to the storage device 3.

Herein, although not illustrated, when the connection via the communication route 11 using the connection request 21a is successful, the control device 1 may transmit the input/output request to the storage device 3 via the communication route 11. However, herein, as illustrated on a right side of FIG. 1, it is assumed that the connection via the communication route 11 using the connection request 21a is unsuccessful due to an abnormality of the communication route 11. Meanwhile, it is assumed that the connection between the connection control device 2b and the storage device 3 using the connection request 21b is successful.

Upon recognizing that the connection via the communication route 11 is unsuccessful, the control device 1 transmits a connection request 21c requesting a connection with the storage device 3 via the communication route 12. Upon receiving the connection request 21c after a successful connection with the storage device 3, the connection control device 2b transmits a success notification 23 indicating that the connection is successful to the control device 1.

The control device 1 receives the success notification 23, recognizes that the connection via the communication route 12 is successful, and transmits the input/output request (not illustrated) for the storage device 3 through the communication route 12. Since the connection between the connection control device 2b and the storage device 3 has been successful, the connection control device 2b transmits the input/output request received from the control device 1 to the storage device 3. Each of the control device 1 and the connection control devices 2a and 2b has a hardware configuration similar to a hardware configuration (described later) illustrated in FIG. 3. At least, each has a processor, a random access memory (RAM), an auxiliary storage device, and a communication interface.

According to the above processing, in parallel with the connection request processing between the control device 1 and the storage device 3 via the communication route 11, the connection request processing between the connection control device 2b and the storage device 3 in the communication route 12 is executed. In addition, when the connection between the connection control device 2b and the storage device 3 is successful when the connection via the communication route 11 is unsuccessful, a response corresponding to the connection request 21c transmitted from the control device 1 is then returned not from the storage device 3 but from the connection control device 2b. Therefore, it is possible to shorten a waiting time of the control device 1 up to the time when the response is received as compared with a case where the response is returned from the storage device 3. Therefore, it is possible to enhance an access performance to the storage device 3 when an abnormality of one communication route occurs.

Second Embodiment

Figure 2:
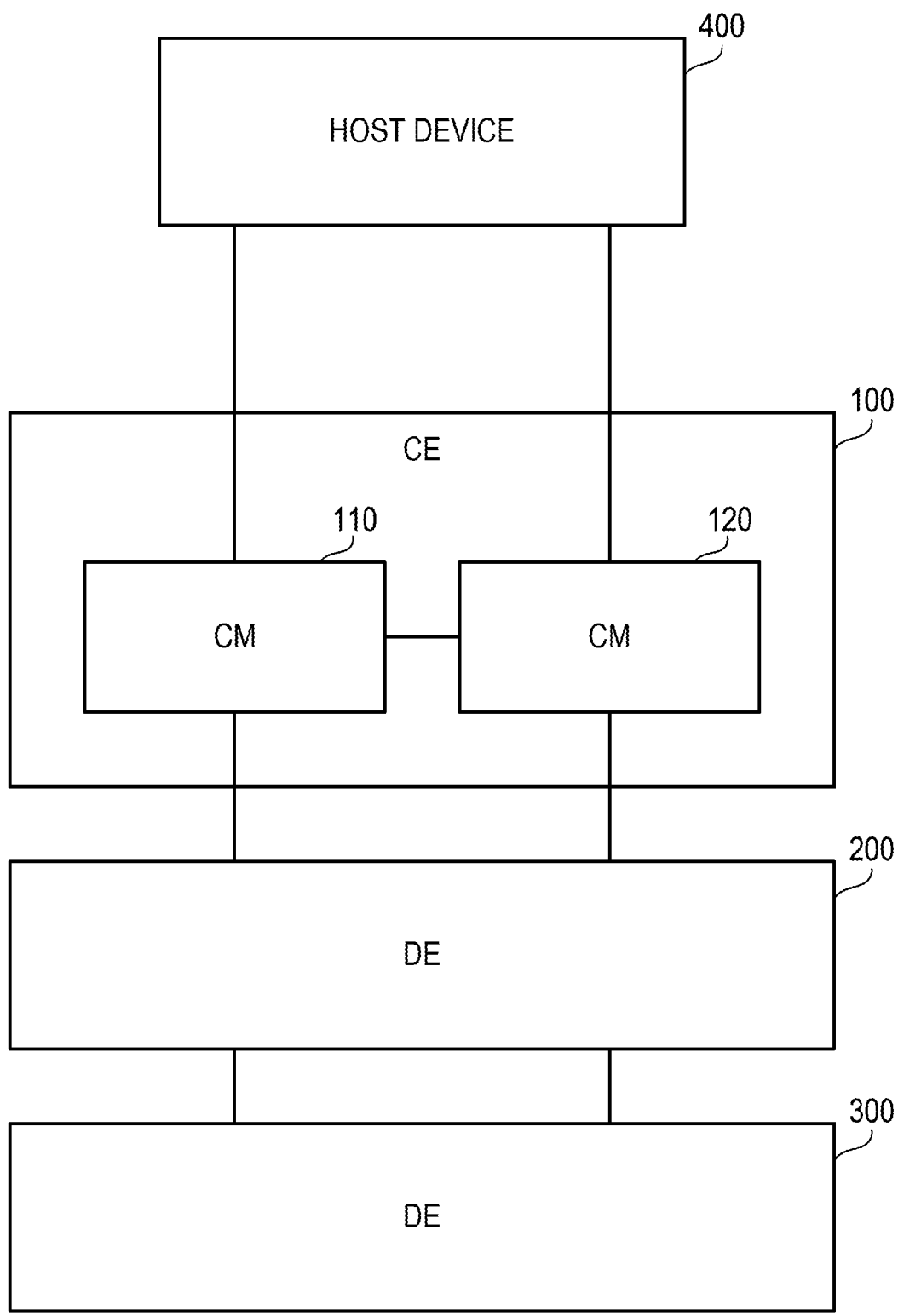
FIG. 2 is a diagram illustrating a configuration example of a storage system according to a second embodiment.

FIG. 2 is a diagram illustrating a configuration example of a storage system according to a second embodiment. The storage system illustrated in FIG. 2 includes a controller enclosure (CE) 100 and drive enclosures (DEs) 200 and 300. Controller modules (CMs) 110 and 120 are mounted on the CE 100. Multiple HDDs is mounted on each of the DEs 200 and 300. Further, the DEs 200 and 300 are connected in series to the CMs 110 and 120 in the order. In addition, the number of DEs included in the storage system is not limited to two as in the example of FIG. 2 and may be a predetermined number of one or three or more.

A host device 400 is connected to the CMs 110 and 120. The CMs 110 and 120 are storage control devices that access the HDDs mounted in the DEs 200 and 300 in response to a request from the host device 400. For example, the CMs 110 and 120 set logical volumes using storage areas of the HDDs mounted on the DEs 200 and 300 and accept the access to the logical volume from the host device 400.

The CMs 110 and 120 and the host device 400 are connected via a storage area network (SAN) using, for example, a fiber channel (FC), Internet small computer system interface (iSCSI), or the like. In addition, multiple host devices 400 may be connected to the CMs 110 and 120. In this case, for example, one host device 400 may access the HDDs of the DEs 200 and 300 via the CM 110 and another host device 400 may access the HDDs of the DEs 200 and 300 via the CM 120. Further, the storage device to be accessed from the host device 400, which be included in the DEs 200 and 300 is not limited to the HDD but may be another type of non-volatile storage device such as an SSD.

Figure 3:
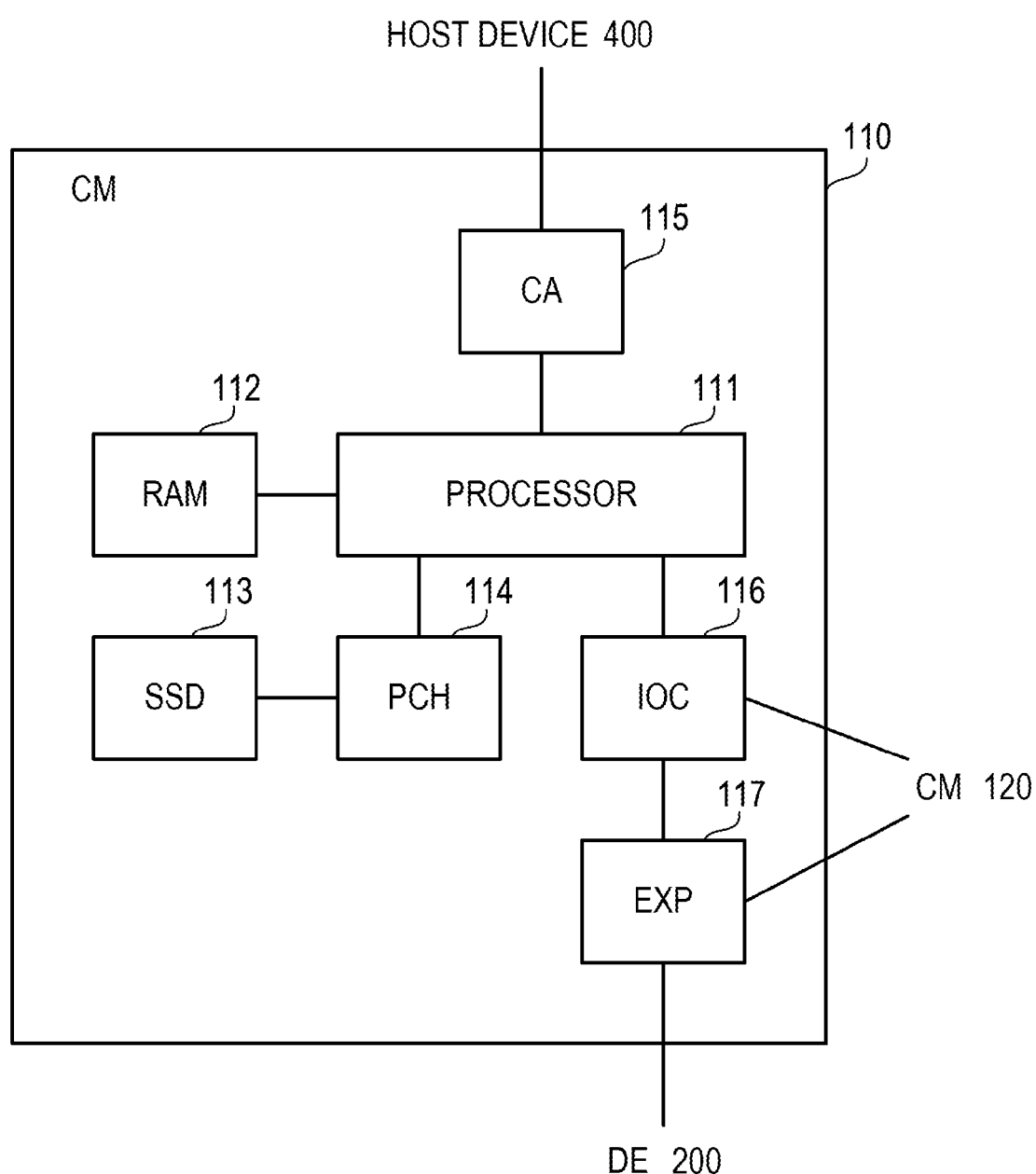
FIG. 3 is a diagram illustrating a hardware configuration example of a CM.

FIG. 3 is a diagram illustrating a hardware configuration example of a CM. Further, as one example, in FIG. 3, a hardware configuration of the CM 110 is illustrated, but the CM 120 may also be implemented by the same hardware configuration as the CM 110.

The CM 110 includes a processor 111, a RAM 112, an SSD 113, a platform controller hub (PCH) 114, a channel adapter (CA) 115, an input output controller (IOC) 116, and an expander (EXP) 117.

The processor 111 comprehensively controls the entirety of the CM 110. The processor 111 is, for example, any one of a central processing unit (CPU), a micro processing unit (MPU), a digital signal processor (DSP), an application specific integrated circuit (ASIC), a graphics processing unit (GPU), and a programmable logic device (PLD). Further, the processor 111 may be, for example, a combination of two or more elements among the CPU, the MPU, the DSP, the ASIC, the GPU, and the PLD.

The RAM 112 is a main storage device of the CM 110. The RAM 112 temporarily stores at least a part of a program of an operating system (OS) or an application program executed in the processor 111. Further, the RAM 112 stores various data used for the processing by the processor 111.

The SSD 113 is an auxiliary storage device of the CM 110. The programs of the OS, the application programs, and various data are stored in the SSD 113. Further, the CM 110 may include the HDD instead of the SSD 113 as the auxiliary storage device. The PCH 114 transmits and receives data between the processor 111 and the SSD 113.

The CA 115 is an interface for communication with the host device 400. The IOC 116 is an interface which transmits and receives data between the processor 111 and the HDDs in the DEs 200 and 300. The expander 117 relays data transmitted and received between the IOC 116 and the DE 200. Further, although details will be described later, the IOC 116 and the expander 117 are also connected to the other CM 120.

In the embodiment, as an example, it is assumed that the IOC 116 is an SAS interface that operates as a serial attached small computer system interface (SCSI) (SAS) initiator. Further, it is assumed that the expander 117 is an SAS expander.

Figure 4:
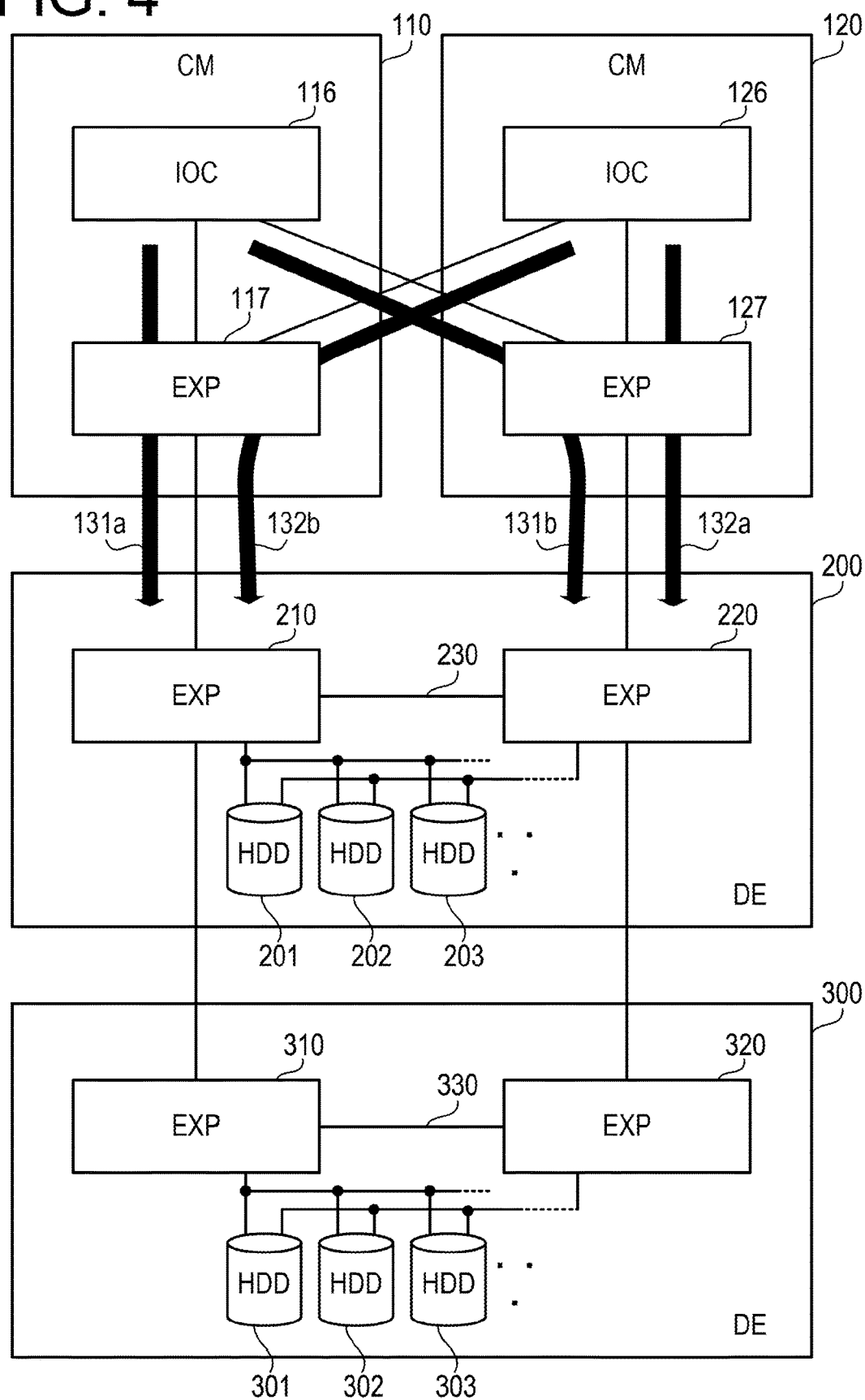
FIG. 4 is a diagram illustrating an internal configuration example of a DE.

FIG. 4 is a diagram illustrating an internal configuration example of a DE. Further, in FIG. 4, connection states between the CMs 110 and 120 and the DEs 200 and 300 are also illustrated.

The DE 200 includes HDDs 201, 202, 203, . . . , and expanders 210 and 220. The DE 300 includes HDDs 301, 302, 303, . . . , and expanders 310 and 320.

The HDDs 201, 202, 203, . . . are storage devices to be accessed from the host device 400. Each of the HDDs 201, 202, 203, . . . is connected to both the expanders 210 and 220. The expander 210 relays data transmitted and received between the expander 117 of the CM 110 and the HDDs 201, 202, 203, . . . . Further, the expander 210 is also connected with the expander 310 of the DE 300 to relay even data transmitted and received between the expander 117 and the expander 310.

Meanwhile, the expander 220 relays data transmitted and received between the expander 127 of the CM 120 and the HDDs 201, 202, 203, . . . . Further, the expander 220 is also connected with the expander 320 of the DE 300 to relay even data transmitted and received between the expander 127 and the expander 320. In addition, the expander 210 and the expander 220 may directly communicate with each other via a communication route 230.

The HDDs 301, 302, 303, . . . are the storage devices to be accessed from the host device 400. Each of the HDDs 301, 302, 303, . . . is connected to both the expanders 310 and 320. The expander 310 relays data transmitted and received between the expander 210 of the DE 200 and the HDDs 301, 302, 303, . . . . The expander 320 relays data transmitted and received between the expander 220 of the DE 200 and the HDDs 301, 302, 303, . . . . In addition, the expander 310 and the expander 320 may directly communicate with each other via a communication route 330.

In the embodiment, all of the expanders 210, 220, 310, and 320 are SAS expanders.

Figure 5:
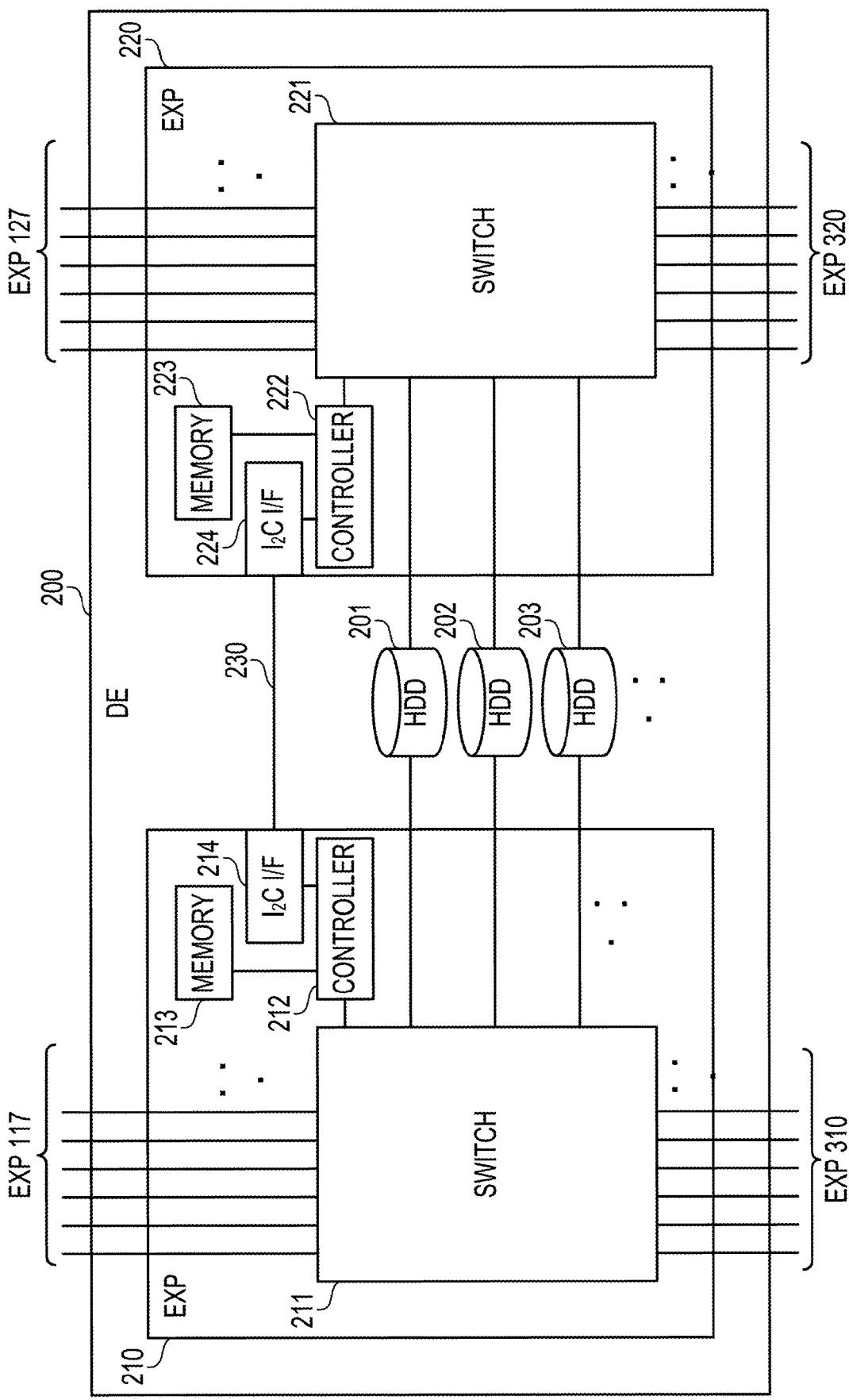
FIG. 5 is a diagram illustrating the internal configuration example of an expander.

Herein, FIG. 5 is a diagram illustrating the internal configuration example of an expander. Further, in FIG. 5, as an example, the expanders 210 and 220 of the DE 200 are illustrated, but the expanders 310 and 320 of the DE 300 may also be implemented by the same hardware configuration.

The expander 210 includes a switch 211, a controller 212, a memory 213, and an $I_2C$ interface (I/F) 214. Further, the expander 220 includes a switch 221, a controller 222, a memory 223, and an $I_2C$ interface (I/F) 224.

Under the control by the controller 212, the switch 211 relays data transmitted and received between the expander 117 of the CM 110 and the HDDs 201, 202, 203, . . . in the DE 200 or the expander 310 of the DE 300.

The controller 212 controls a data relay operation in the switch 211. Further, the controller 212 may communicate with the controller 222 of the other expander 220 via the communication route 230. In addition, the controller 212 may include, for example, a processor, and may read a firmware program stored in the memory 213 and execute various processing according to the firmware program.

The memory 213 stores various data used in the processing of the controller 212. Further, when the controller 212 includes the processor, the memory 213 stores the firmware program executed in the controller 212.

The $I_2C$ interface 214 is connected with the $I_2C$ interface 224 of the other expander 220 via the communication route 230. Further, in the embodiment, it is assumed that the communication route 230 is an $I_2C$ bus. The $I_2C$ interface 214 controls communication between the controller 212 and the other expander 220.

Meanwhile, the expander 220 has the same hardware configuration as the expander 210. That is, the switch 221 relays data transmitted and received between the expander 127 of the CM 120 and the HDDs 201, 202, 203, . . . in the DE 200 or the expander 320 of the DE 300. The controller 222 controls the data relay operation in the switch 221. The memory 223 stores various data used in the processing of the controller 222. The $I_2C$ interface 224 controls communication between the controller 222 and the other expander 210.

Next, an access route from the IOC to the HDD will be described with reference to FIG. 4.

Two access routes are installed between the IOC 116 of the CM 110 and the HDD in each of the DEs 200 and 300.

Specifically, the access routes from the IOC 116 to the HDDs 201, 202, 203, . . . of the DE 200 include a route which passes through the expanders 117 and 210 and a route which passes through the expanders 127 and 220. Further, the access routes from the IOC 116 to the HDDs 300, 301, 302, . . . of the DE 300 include a route which passes through the expanders 117, 210, and 310 and a route which passes through the expanders 127, 220, and 320.

Similarly, two access routes are also installed between the IOC 126 of the CM 120 and the HDD in each of the DEs 200 and 300. Specifically, the access routes from the IOC 126 to the HDDs 201, 202, 203, . . . of the DE 200 include a route which passes through the expanders 127 and 220 and a route which passes through the expanders 117 and 210. Further, the access routes from the IOC 126 to the HDDs 300, 301, 302, . . . of the DE 300 include a route which passes through the expanders 127, 220, and 320 and a route which passes through the expanders 117, 210, and 310.

As described above, the access routes to each HDD from the IOCs 116 and 126 are made redundant. As a result, when the IOCs 116 and 126 may not access the HDD using one access route, the IOCs 116 and 126 may attempt to access the HDD by using the other access route.

In the embodiment, of the access routes to the respective HDDs from the IOC 116, the route which passes through the expander 117 is referred to as a "normal route 131*a*" and the route which passes through the expander 127 is referred to as a "detour route 131*b*". It is assumed that the normal route 131*a* is an access route used in normal times and the detour route 131*b* is an access route that is used preliminarily when the normal route 131*a* may not be used.

Of the access routes to the respective HDDs from the IOC 126, the route which passes through the expander 127 is referred to as a "normal route 132*a*" and the route which passes through the expander 117 is referred to as a "detour route 132*b*". It is assumed that the normal route 132*a* is an access route used in the normal times and the detour route 132*b* is an access route that is used preliminarily when the normal route 132*a* may not be used.

However, the IOC and the expander are connected and the expander and the expander are connected by multiple physical links. Specifically, the IOC 116 and the expander 117, the IOC 116 and the expander 127, the expander 117 and the expander 210, the expander 210 and the expander 310, the IOC 126 and the expander 127, the IOC 126 and the expander 117, the expander 127 and the expander 220, and the expander 220 and the expander 320 are respectively connected by two or more of the same number of physical links. Herein, the physical link is a minimum unit of communication route which performs serial communication and includes a differential signal line pair for transmission and a differential signal line pair for reception.

According to the SAS standard, it is possible to perform communication by bundling multiple physical links and using the bundled physical links as one virtual communication route. Such a virtual communication route is called "wide link". Further, when the communication is performed by individually using the physical links without using the wide link, each physical link is called "narrow link".

In the SAS standard, a connection is established by the unit of the wide link or the narrow link between the IOC which is the initiator and the HDD which is a target device. Then, between the IOC and the HDD of which the connection is established, the communication is performed using exclusively the communication route (wide link or narrow link). Further, the communication is performed in parallel between the communication routes of which the connection is established.

In the following description, a route on which the wide link or the narrow link is formed is described as a "communication route". For example, it is assumed that the number of communication routes between the IOC and the expander and between the expander and the expander is "4". In this case, since four communication routes are formed in the access route to the HDD side via the expander 117, a maximum of four connections are established in the normal route 131*a* and the detour route 132*b*. That is, the total number of HDDs that may be simultaneously accessed using the normal route 131*a* and the detour route 132*b* is limited to an upper limit of "4" or less. Similarly, since four communication routes are formed in the access route to the HDD side via the expander 127, a maximum of four connections are established even in the normal route 132*a* and the detour route 131*b*. That is, the total number of HDDs that may be simultaneously accessed using the normal route 132*a* and the detour route 131*b* is limited to the upper limit "4" or less.

Next, a procedure of the access from the IOC to the HDD will be described. In particular, herein, a case where the access using the normal route is unsuccessful and the access using the detour route is performed will be described. In the following description, first, a comparative example of the access procedure will be described with reference to FIG. 6, the problem will be described, and thereafter, the access procedure in the second embodiment will be described with reference to FIGS. 7 and 8.

Figure 6:
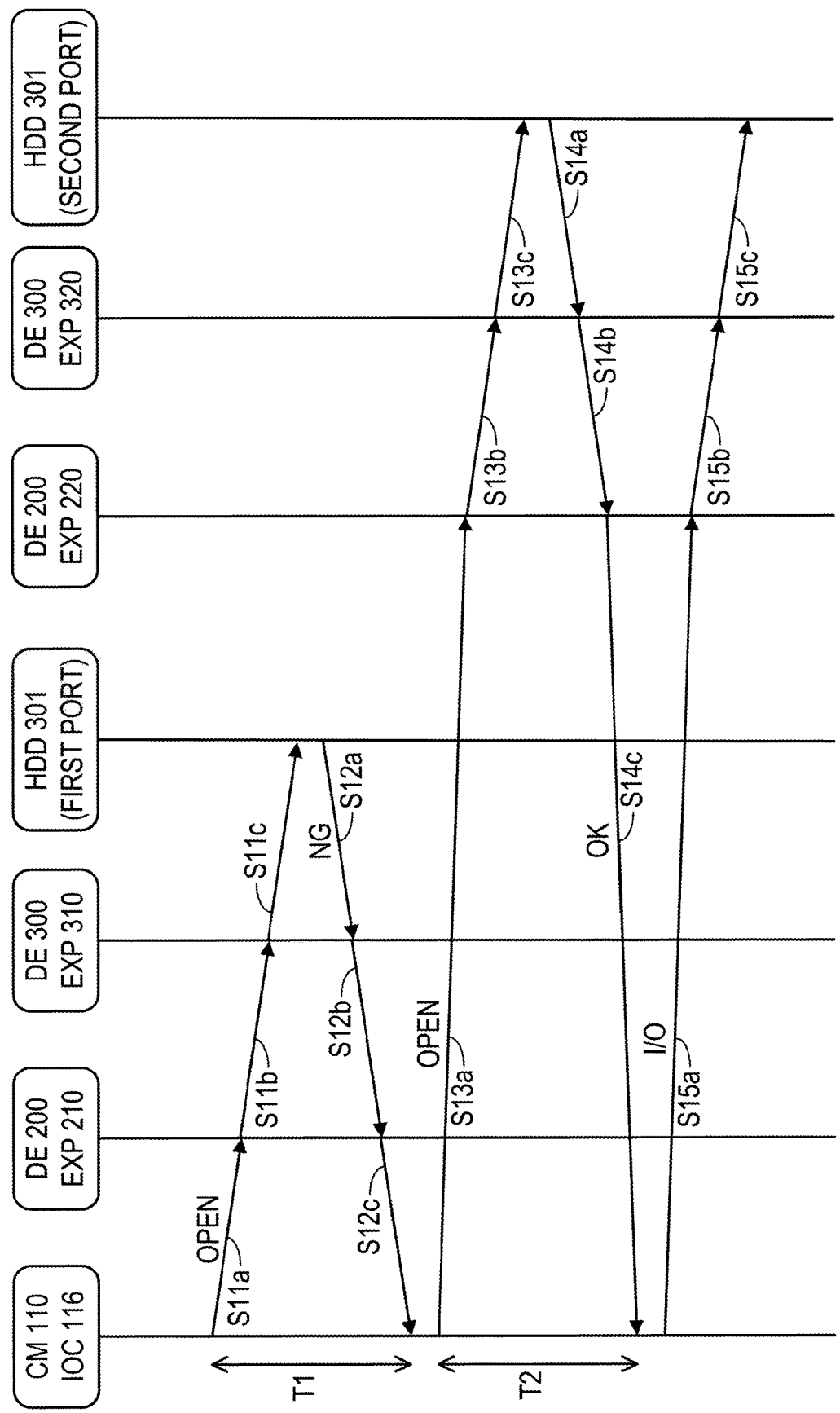
FIG. 6 is a sequence diagram illustrating a comparative example of an access procedure from an IOC to an HDD.

FIG. 6 is a sequence diagram illustrating a comparative example of an access procedure from an IOC to an HDD. In FIG. 6, a procedure when the IOC 116 of the CM 110 accesses the HDD 301 of the DE 300 is illustrated as an example.

First, the IOC 116 transmits an OPEN message for requesting establishment of connection to the HDD 301 to the HDD 301 via the normal route 131*a* (step S11*a*). That is, the OPEN message is transmitted from the IOC 116 to the expander 117. The transmitted OPEN message is transmitted to the expander 210 of the DE 200 and also transmitted to the expander 310 of the DE 300 (step S11*b*) and received by the HDD 301 (step S11*c*). Assuming that the HDD 301 has a first port connected to the expander 310 and a second port connected to the expander 320, the OPEN message is received at a first port.

In the process of transmitting the OPEN message, when each of the expanders 117, 210, and 310 receives the OPEN message, each of the expanders 117, 210, and 310 locks the communication route used for the reception. As a result, the communication route is occupied and it is impossible to transmit another OPEN message via the communication route.

Herein, it is assumed that the IOC 116 fails to establish the connection. For example, it is assumed that a response message indicating that a connection establishment request may not be accepted from the HDD 301 is transmitted because the port at the expander 310 side is busy or the like (step S12*a*). In this case, the response message is transmitted from the expander 310 to the expander 210 (step S12*b*) and also transmitted to the expander 117 and received by the IOC 116 (step S12*c*). Further, as another example, the IOC 116 may recognize that the establishment of the connection is unsuccessful because the response may not be received within a predetermined time-out period from the transmission of the OPEN message.

When the IOC 116 recognizes that the connection establishment is unsuccessful, the IOC 116 attempts to establish the connection with the HDD 301 via the detour route 131*b*. That is, the IOC 116 transmits the OPEN message addressed to the HDD 301 via the detour route 131*b* (step S13*a*). The OPEN message is transmitted from the IOC 116 to the expander 127 of the CM 120, transmitted to the expander 220 of the DE 200, transmitted to the expander 320 of the DE 300 (step S13*b*), and received at the second port of the HDD 301 (step S13*c*). Further, in the process of transmitting the OPEN message, when each of the expanders 127, 220, and 320 receives the OPEN message, each of the expanders 127, 220, and 320 locks the communication route used for the reception.

When accepting the connection establishment request, the HDD 301 returns a response message (specifically, an OPEN_ACCEPT message) indicating the purpose (step S14*a*). The response message is transmitted from the expander 320 to the expander 220 (step S14*b*) and also transmitted to the expander 127 and received by the IOC 116 (step S14*c*).

As a result, the connection via the detour route 131*b* is established between the IOC 116 and the HDD 301. The IOC 116 transmits an (input/output) I/O command which requests reading or writing of data from or to the HDD 301 (step S15*a*). The I/O command is transmitted to the expander 127 of the CM 120, transmitted to the expander 220 of the DE 200, transmitted to the expander 320 of the DE 300 (step S15*b*), and received by the HDD 301 (step S15*c*).

Within a predetermined time after the expanders 117, 210, and 310 lock the communication route with reception of the OPEN message or thereafter, the data is last transmitted through the communication route, the expanders 117, 210, and 310 release the lock of the communication route. Meanwhile, after the step S15*a*, when the I/O processing with the HDD 301 is completed, the IOC 116 transmits a message for indicating a lock release. In response to the reception of the message, the expanders 127, 220, and 320 release the lock of the communication route.

In the processing of FIG. 6, the IOC 116 first transmits the OPEN message via the normal route 131*a* and waits for reception of the response message. In the example of FIG. 6, it takes a waiting time T1 until the response message is received. Then, after recognizing that the establishment of the connection is unsuccessful, the IOC 116 transmits the OPEN message via the detour route 131*b* and waits for the reception of the response message. In the example of FIG. 6, it takes a waiting time T2 until the response message is received.

As described above, in the above processing, the processing of transmitting the OPEN message and receiving the response message is repeated twice. Therefore, there is a problem that it takes a long time until the I/O command may be transmitted after the connection with the HDD 301 is established.

For example, when the response message to the OPEN message transmitted in step S11*a* is not returned, the IOC 116 waits for the reception of the response message until a predetermined time-out period elapses. However, since the time-out period is set to be longer than the above waiting time T1, in this case, the time until the I/O command may be transmitted becomes longer.

As an example of a solution to such a problem, a method is conceivable in which the IOC 116 simultaneously transmits the OPEN message with respect to both the normal route 131*a* and the detour route 131*b*. However, in such a method, although only one communication route is used for actual communication, two communication routes are temporarily occupied. Therefore, for example, there is a possibility that the IOC 126 that uses the communication route passing through the expanders 127 and 220 as the normal route 132*a* will be deprived of an opportunity to communicate via the normal route 132*a*, resulting in deterioration in communication efficiency.

In response to such a problem, in the storage system according to the second embodiment, the operations illustrated in FIGS. 7 and 8 below are performed.

Figure 7:
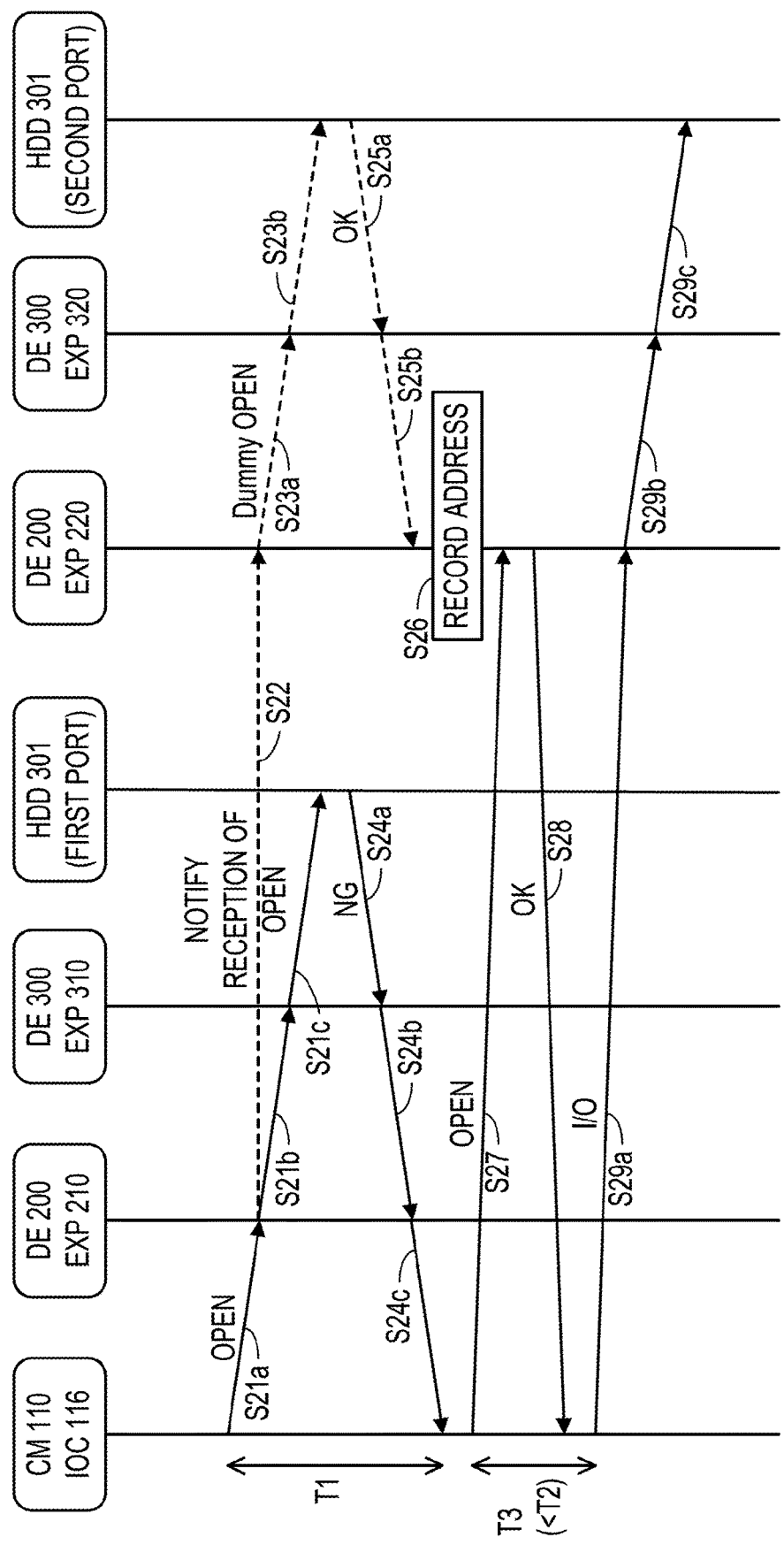
FIG. 7 is a sequence diagram illustrating a first example of an access procedure in a second embodiment.

FIG. 7 is a sequence diagram illustrating a first example of an access procedure in a second embodiment. In the example of FIG. 7, the operations of the expanders 210 and 220 included in the DE 200 directly connected to the CM 110 (DE at the first stage) are different from those in the comparative example of FIG. 6.

Similarly to the comparative example of FIG. 6, first, the IOC 116 transmits the OPEN message for requesting the establishment of the connection to the HDD 301 to the HDD 301 via the normal route 131*a* (step S21*a*). The OPEN message is transmitted from the IOC 116 to the expander 117 and transmitted to the expander 210 of the DE 200.

Upon receiving the OPEN message, the expander 210 transmits the OPEN message to the expander 310 of the DE 300 (step S21*b*). At the same time, the expander 210 notifies the other expander 220 of the reception of the OPEN message via the communication route 230 (step S22). Further, similarly to the comparative example of FIG. 6, the OPEN message transmitted to the expander 310 is received at the first port of the HDD 301 (step S21*c*).

Upon receiving the reception notification of the OPEN message, the other expander 220 determines whether the communication route with the HDD 301 has an empty space (i.e., whether there is a communication route that is not locked). When it is determined that the communication route has the empty space, the expander 220 transmits the OPEN message addressed to the HDD 301 to the expander 320 of the DE 300 (step S23*a*). Hereinafter, the OPEN message transmitted from the expander as a starting point is described as a "dummy OPEN message". In addition, as the dummy OPEN message is transmitted, the expander 220 locks the communication route used for the transmission.

The dummy OPEN message transmitted to the expander 320 is received at the second port of the HDD 301 (step S23*b*). As a result, the processing of steps S22, S23*a*, and S23*b* is executed in parallel with the processing of steps S21*b* and S21*c*.

Herein, similarly to the comparative example of FIG. 6, it is assumed that the HDD 301 returns a response message indicating that the connection establishment request may not be accepted with respect to the OPEN message received from the expander 310 (step S24*a*). The response message is transmitted from the expander 310 to the expander 210 (step S24*b*) and also transmitted to the expander 117 and received by the IOC 116 (step S24*c*).

Meanwhile, it is assumed that the HDD 301 returns the OPEN_ACCEPT message indicating an acceptance of the connection establishment request in response to the dummy OPEN message received from the expander 320 (step S25*a*). The OPEN_ACCEPT message is transmitted from the expander 320 to the expander 220 (step S25*b*). When the expander 220 receives the OPEN_ACCEPT message, the communication route is secured between the expander 220 and the HDD 301. In this case, the expander 220 records an SAS address of the HDD 301 in the memory 223 (step S26).

When the IOC 116 recognizes that the connection establishment is unsuccessful from the response message received in step S24c, the IOC 116 attempts to establish the connection with the HDD 301 via the detour route 131b similarly to the comparative example of FIG. 6. That is, the IOC 116 transmits the OPEN message addressed to the HDD 301 via the detour route 131b (step S27). The OPEN message is transmitted from the IOC 116 to the expander 127 of the CM 120 and received by the expander 220 of the DE 200.

The expander 220 extracts the SAS address of the HDD 301 as a reception destination from the received OPEN message and determines whether the SAS address is recorded in the memory 223. In the example of FIG. 7, the corresponding SAS address is recorded as the processing of step S26. When it is determined that the corresponding SAS address is recorded, the expander 220 returns the OPEN_ACCEPT message indicating the acceptance of the connection establishment request (step S28). The OPEN_ACCEPT message is transmitted to the IOC 116 via the expander 127.

When the IOC 116 receives the OPEN_ACCEPT message, the communication route is secured between the IOC 116 and the expander 220. Since the communication route is already secured between the expander 220 and the HDD 301, the connection between the IOC 116 and the HDD 301 is established at this time. Thereafter, the IOC 116 may instruct the HDD 301 to execute the I/O processing by transmitting the I/O command through the secured communication route (steps S29a to S29c).

In the above processing of FIG. 7, the OPEN message transmitted from the IOC 116 is transmitted from the expander 210 to the HDD 301 and the response message thereto is returned to the IOC 116. In parallel with such an operation, the dummy OPEN message from the expander 220 is transmitted to the HDD 301 and the response message thereto is returned to the expander 220. That is, an operation for securing the communication route from the expander 220 to the HDD 301, which is a part of the communication route on the detour route 131b, is performed in parallel with the operation for securing the communication route on the normal route 131a from the IOC 116 to the HDD 301.

When the IOC 116 recognizes that the connection establishment in the normal route 131a is unsuccessful, the IOC 116 attempts to establish a connection in the detour route 131b. In this case, the OPEN message transmitted from the IOC 116 onto the detour route 131b is received by the expander 220 without reaching the HDD 301 as the reception destination and the response message is returned from the expander 220. As a result, the connection on the detour route 131b from the IOC 116 to the HDD 301 is established and the IOC 116 starts a transmission of the I/O command in response to the response message from the expander 220.

Through such an operation, a waiting time T3 until the IOC 116 receives the response message after transmitting the OPEN message on the detour route 131b may be shorter than the waiting time T2 illustrated in FIG. 6. Therefore, it is possible to shorten the time until the I/O command may be transmitted to the HDD 301.

Figure 8:
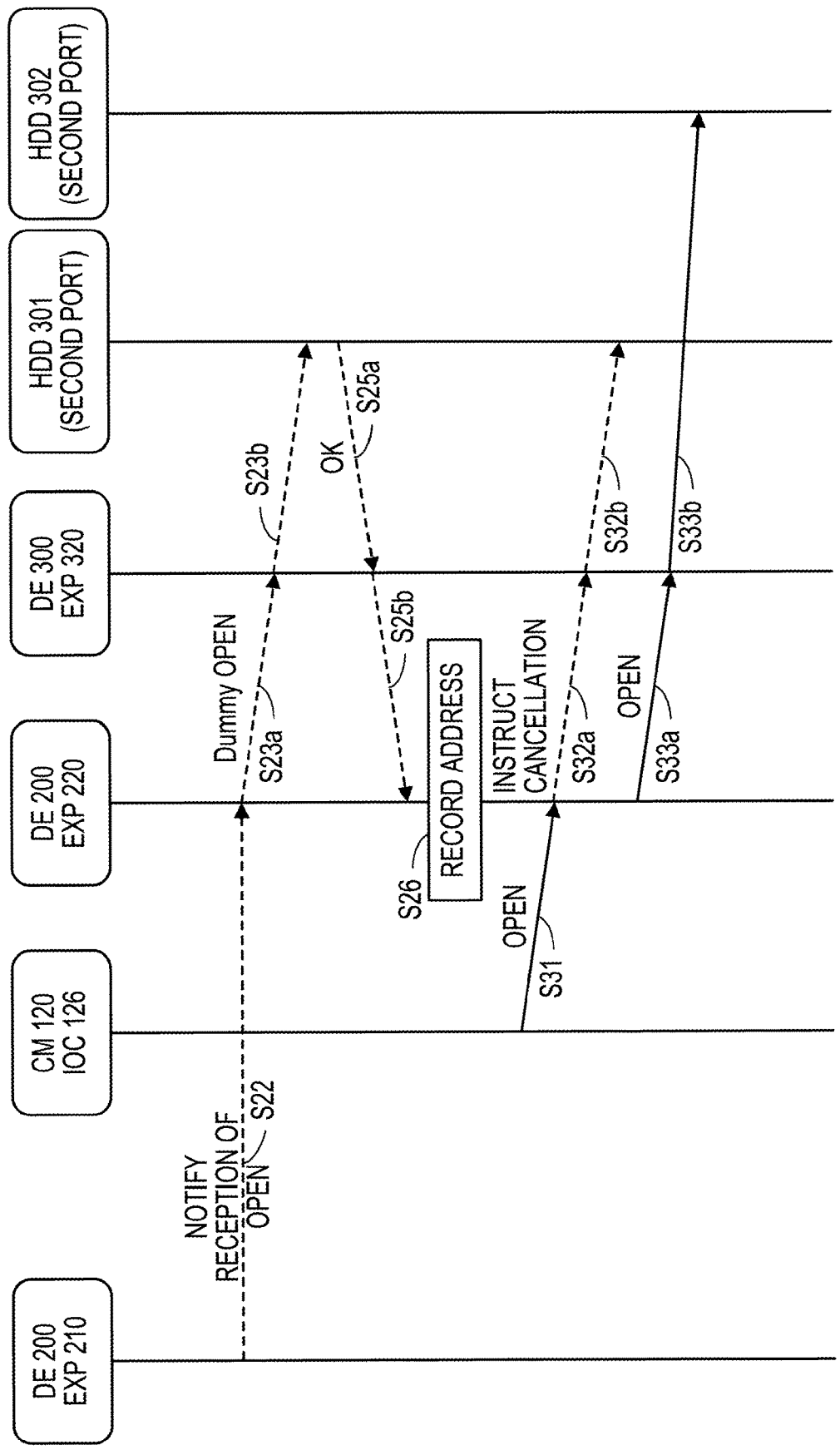
FIG. 8 is a sequence diagram illustrating a second example of the access procedure in the second embodiment.

FIG. 8 is a sequence diagram illustrating a second example of the access procedure in the second embodiment. Further, in FIG. 8, the same processing as FIG. 7 is denoted by the same step number.

FIG. 8 illustrates a processing example in the case where the expander 220 receives the OPEN message via the normal route 132a in a state where the communication route is secured by the dummy OPEN message in the processing of FIG. 7. For example, it is assumed that after the expander 220 records the SAS address of the HDD 302 in the memory 223 in step S26, before the IOC 116 transmits the OPEN message in step S27, the IOC 126 of the CM 120 transmits the OPEN message (step S31). Here, it is assumed that the transmitted OPEN message is a message addressed to the HDD 302 of the DE 300.

In this case, it is assumed that the communication route from the expander 220 to the HDD side has no empty space. In this case, it is determined that the communication route secured according to the OPEN message transmitted via the normal route 132a takes priority over the communication route secured according to the dummy OPEN message. The reason is that the communication route secured according to the dummy OPEN message is a communication route under reservation, which is not yet used by communication by the IOC 116.

Therefore, the expander 220 executes processing for releasing the communication route secured between the expander 220 and the HDD 302 according to the dummy OPEN message. Specifically, the expander 220 releases the lock of the communication route to the HDD 302. At the same time, the expander 220 transmits a cancellation instruction message for canceling the dummy OPEN message addressed to the HDD 302 (specifically, a CLOSE message) to the HDD 302 (step S32a).

Upon receiving the cancellation instruction message, the expander 320 of the DE releases the lock of the communication route to the HDD 301 and transmits the cancellation instruction message to the HDD 301 (step S32b). As a result, the communication route between the expander 220 and the HDD 301 is released. Further, although not illustrated, in fact, the cancellation instruction message (CLOSE message) is also transmitted from the HDD 301 to the expander 220.

When the communication route between the expander 220 and the HDD 301 is released, the expander 220 transmits the OPEN message addressed to the HDD 302, which is received from the IOC 126, to the expander 320 (step S33a). The OPEN message is also transmitted from the expander 320 to the HDD 302 (step S33b). The OPEN message is also received at the second port connected to the expander 320 among the ports of the HDD 302.

Although not illustrated, the OPEN_ACCEPT message addressed to the IOC 126 is returned from the HDD 302 thereafter. As a result, the connection between the IOC 126 and the HDD 302 is established, so that the IOC 126 may transmit the I/O command addressed to the HDD 302.

By the above processing, the OPEN message transmitted via the normal route, which is a regular route, may be processed with a higher priority than the dummy OPEN message for temporarily securing the communication route. Therefore, an influence of the processing for temporarily securing the communication route on the detour route on the transmission processing of the I/O command via the normal route decreases. As a result, it is possible to suppress degradation of the access performance to the HDD via the normal route due to the influence of the processing for temporarily securing the communication route.

Herein, the aforementioned processing example in which the IOC 116 concurrently transmits the OPEN message to both the normal route 131a and the detour route 131b is compared with the processing illustrated in FIG. 8. In the processing example described above, the communication route on the detour route 131b between the IOC 116 and the HDD 301 is secured by transmitting the OPEN message via the detour route 131b. This state continues at least until the IOC 116 determines whether the connection on the normal route 131a is established.

During the continuation period, the communication route is occupied even when the I/O command is not transmitted via the communication route secured on the detour route 131*b*. Therefore, although the communication route passing through the expander 127 has no empty space and furthermore, the OPEN message from the IOC 126 is transmitted during the continuation period, the communication route secured in the above procedure is not released and the IOC 126 may not thus transmit the OPEN message. Therefore, the performance of the access through the normal route 132*a* by the IOC 126 deteriorates.

However, according to the processing of FIG. 8, in the same situation as above, the temporarily secured communication route is released according to the dummy OPEN message and the OPEN message from the IOC 126 is transmitted via the communication route. Therefore, the deterioration of the access performance through the normal route 132*a* by the IOC 126 may be suppressed.

According to the processing of FIG. 8, as compared with the aforementioned processing example, a period during which the communication route is provisionally secured may be shortened, so that the use efficiency of the communication route is enhanced. Therefore, the access performance to the HDD as the entire storage system may be enhanced while enabling an I/O access via the detour route.

Figure 9:
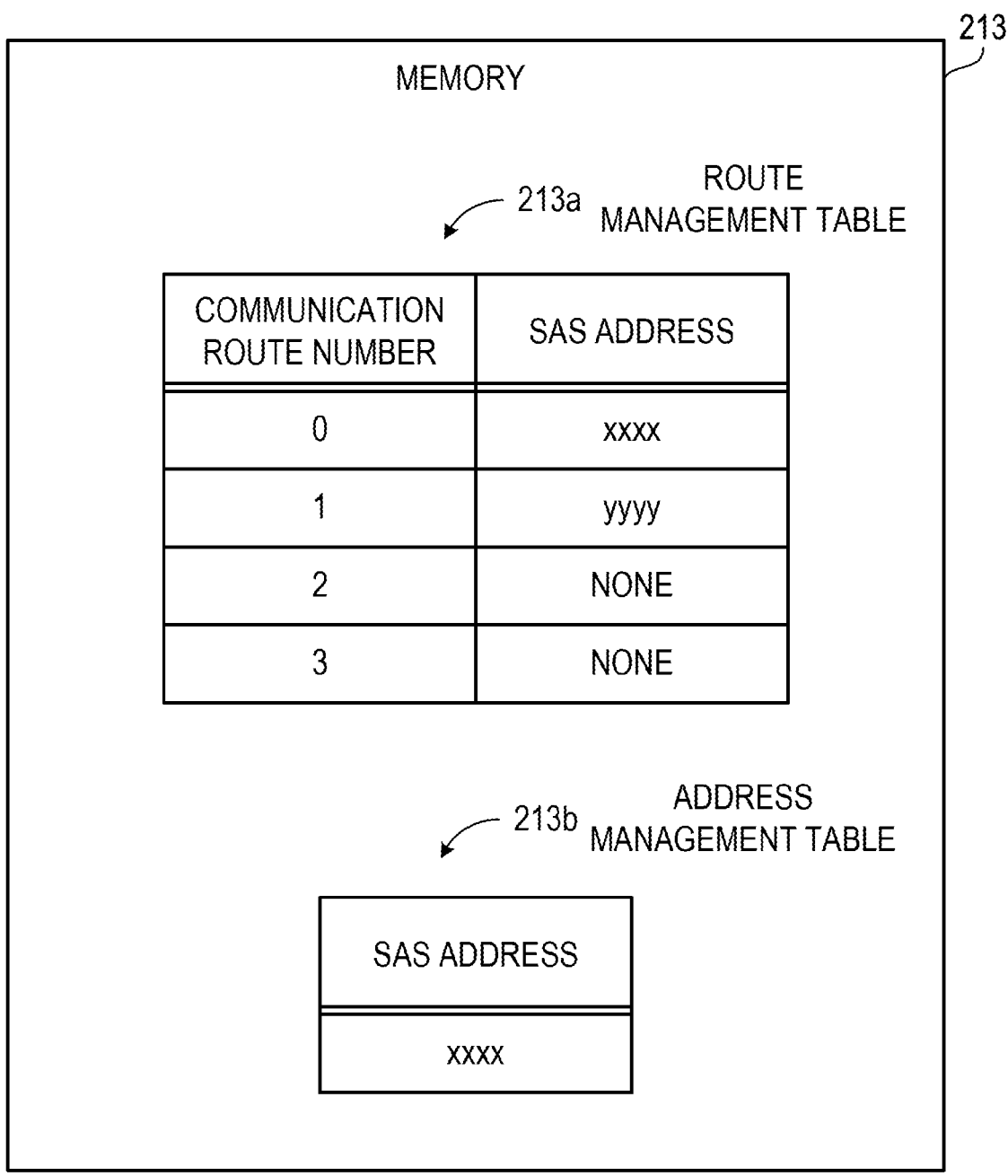
FIG. 9 is a diagram illustrating an example of management information stored in a DE of a first stage.

Next, FIG. 9 is a diagram illustrating an example of management information stored in a DE of a first stage. FIG. 9 illustrates the example of the management information stored in the memory 213 of the expander 210 of the DE 200 as an example, but management information having the same data structure is also stored in the memory 223 of the expander 220.

A route management table 213*a* and an address management table 231*b* are stored in the memory 213.

The route management table 213*a* is a table which manages an empty state of the communication route via the expander 220 and information on the locked communication route. The route management table 213*a* has items of a communication route number and the SAS address.

In the item of communication route number, an identification number of the communication route is registered. In the SAS address item, when the communication route is locked, the SAS address of the HDD as a transmission destination of the OPEN message or the dummy OPEN message is registered. Further, when the communication route is not locked (i.e., when the communication route is empty), "NONE" indicating that there is no registration information is registered in the SAS address.

In the address management table 213*b*, when a predetermined communication route is secured according to the transmission of the dummy OPEN message, the SAS address of the HDD as the transmission destination of the dummy OPEN message is registered. In other words, the SAS address indicating the HDD as the transmission destination of the dummy OPEN message among the SAS addresses registered in the route management table 213*a* is registered in the address management table 213*b*.

Next, the processing of the expanders 210 and 220 mounted on the DE 200 of the first stage will be described with reference to flowcharts.

Figure 10:
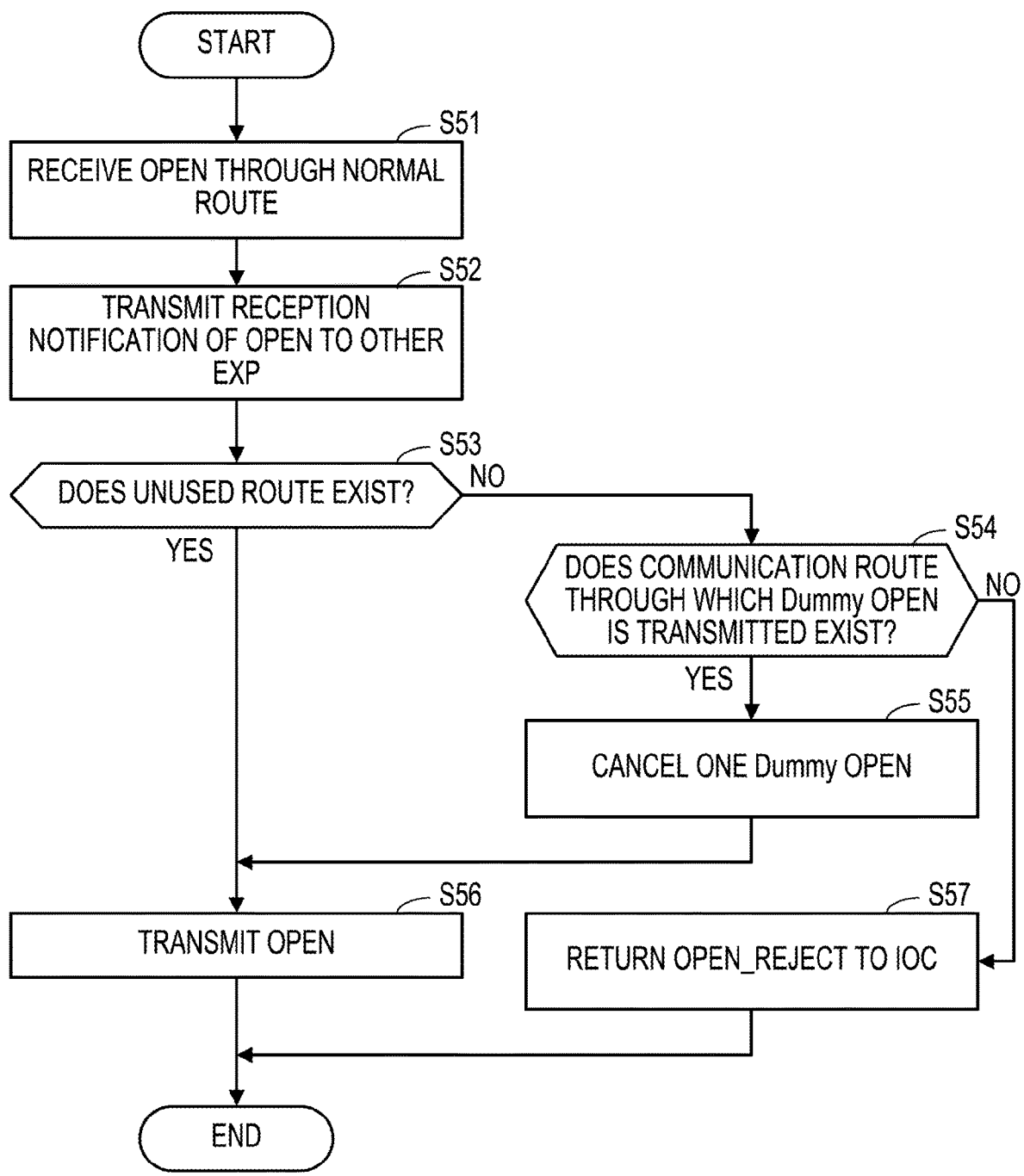
FIG. 10 is a flowchart illustrating a processing example in a case where an OPEN message is received via a normal route.

FIG. 10 is a flowchart illustrating a processing example in a case where an OPEN message is received via a normal route.

(Step S51) The expander receives the OPEN message transmitted from the IOC via the normal route. For example, when the expander 210 executes the processing of FIG. 10, the expander 210 receives the OPEN message transmitted from the IOC 116 of the CM 110. Upon detecting the reception of the OPEN message, a controller of the expander executes the processing after step S52.

(Step S52) The controller transmits a reception notification indicating that the OPEN message is received to the other expander in the same DE 200 via the communication route 230. In this case, the SAS address indicating the HDD as the transmission destination of the received OPEN message is transmitted to the other expander together with the reception notification. Further, the reception notification indicates a requesting the transmission of the dummy OPEN message to the other expander.

(Step S53) The controller refers to the route management table stored in the memory to determine whether there is an unlocked and unused communication route. When there is a record in which the SAS address is not registered among records of the route management table, it is determined that there is an unused communication route. When there is the unused communication route, the controller executes the processing of step S56 and when there is no unused communication route, the controller executes the processing of step S54.

(Step S54) The controller refers to the route management table and determines whether there is the communication route through which the dummy OPEN message is transmitted (i.e., a transmission route locked by transmission of the dummy OPEN message). When one or more SAS addresses are registered in the address management table 213*b*, it is determined that there is the communication route through which the dummy OPEN message is transmitted. When there is the communication route through which the dummy OPEN message is transmitted, the controller executes the processing of step S55 and when there is no communication route through which the dummy OPEN message is transmitted, the controller executes the processing of step S57.

(Step S55) The controller executes processing for canceling the dummy OPEN message of which transmissions is already completed. Specifically, the controller releases the lock on the communication route through which the dummy OPEN message is transmitted and transmits a cancellation instruction message of the dummy OPEN message via the communication route. The transmission destination of the cancellation instruction message is the same HDD as the transmission destination of the dummy OPEN message. The HDD as the transmission destination is determined based on the route management table and the address management table.

The controller deletes the SAS address of the HDD as the transmission destination of the cancellation instruction message from both the route management table and the address management table.

When there are multiple communication routes through which the dummy OPEN message is transmitted, that is, when multiple SAS addresses are registered in the address management table 213*b*, the controller selects one SAS address among the SAS addresses to execute the above processing. For example, the controller selects the SAS address of the HDD as the transmission destination to which the dummy OPEN message is transmitted most recently.

(Step S56) The controller transmits the OPEN message received in step S51 to the HDD as the transmission destination via a switch. Further, the controller locks the communication route through which the OPEN message is transmitted and registers the SAS address of the HDD as the transmission destination of the OPEN message in the record corresponding to the locked communication route among the records of the route management table. In addition, when step S56 is executed after execution of step S55, the OPEN message is transmitted via the communication route of which lock is released in step S55.

(Step S57) The controller returns an OPEN_REJECT message to the IOC as a transmission source of the OPEN message received in step S51 via the switch. The OPEN_REJECT message is a response message indicating that the connection with the HDD as the transmission destination of the received OPEN message may not be established.

Figure 11:
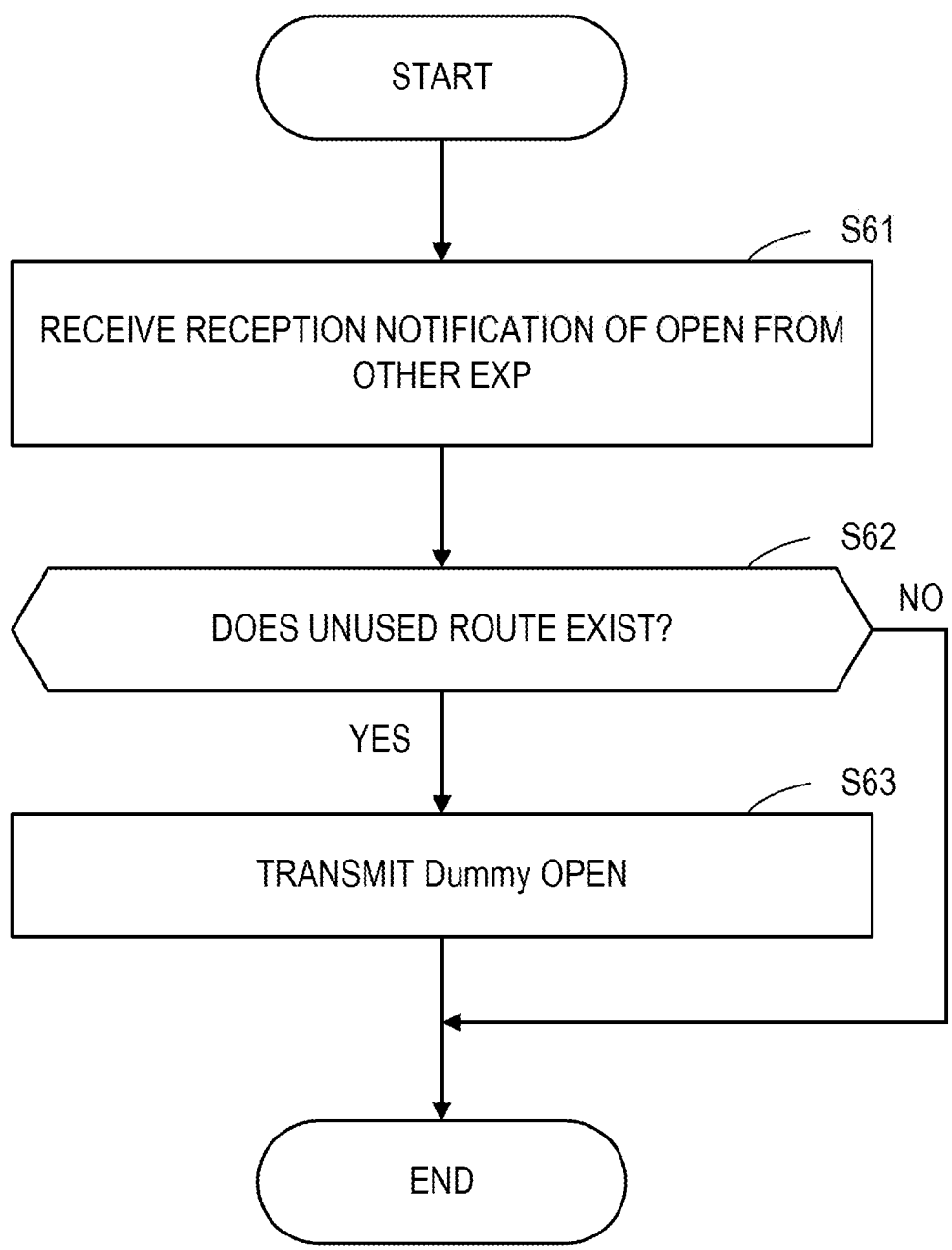
FIG. 11 is a flowchart illustrating a processing example in a case where a reception notification of the OPEN message is received from the other expander in the same DE.

FIG. 11 is a flowchart illustrating a processing example in a case where a reception notification of the OPEN message is received from the other expander in the same DE.

(Step S61) The controller of the expander receives the reception notification of the OPEN message from the other expander within the same DE 200 via the communication route 230. In this case, the controller also receives the SAS address of the HDD as the transmission destination together with the reception notification. For example, when the expander 220 executes the processing of FIG. 11, the expander 220 receives the reception notification of the OPEN message and the SAS address from the expander 210.

The reception processing is executed when the processing of step S52 in FIG. 10 is executed by the other expander. As described above, the reception notification indicates a requesting the transmission of the dummy OPEN message.

(Step S62) The controller refers to the route management table stored in the memory to determine whether there is the unlocked unused communication route. When there is a record in which the SAS address is not registered among records of the route management table, it is determined that there is an unused communication route. When there is the unused communication route, the controller executes the processing of step S63, and when there is no unused communication route, the controller terminates the processing.

(Step S63) The controller transmits the dummy OPEN message, in which the SAS address of the HDD as the transmission destination received in step S61 is configured as the transmission destination, via the switch.

Figure 12:
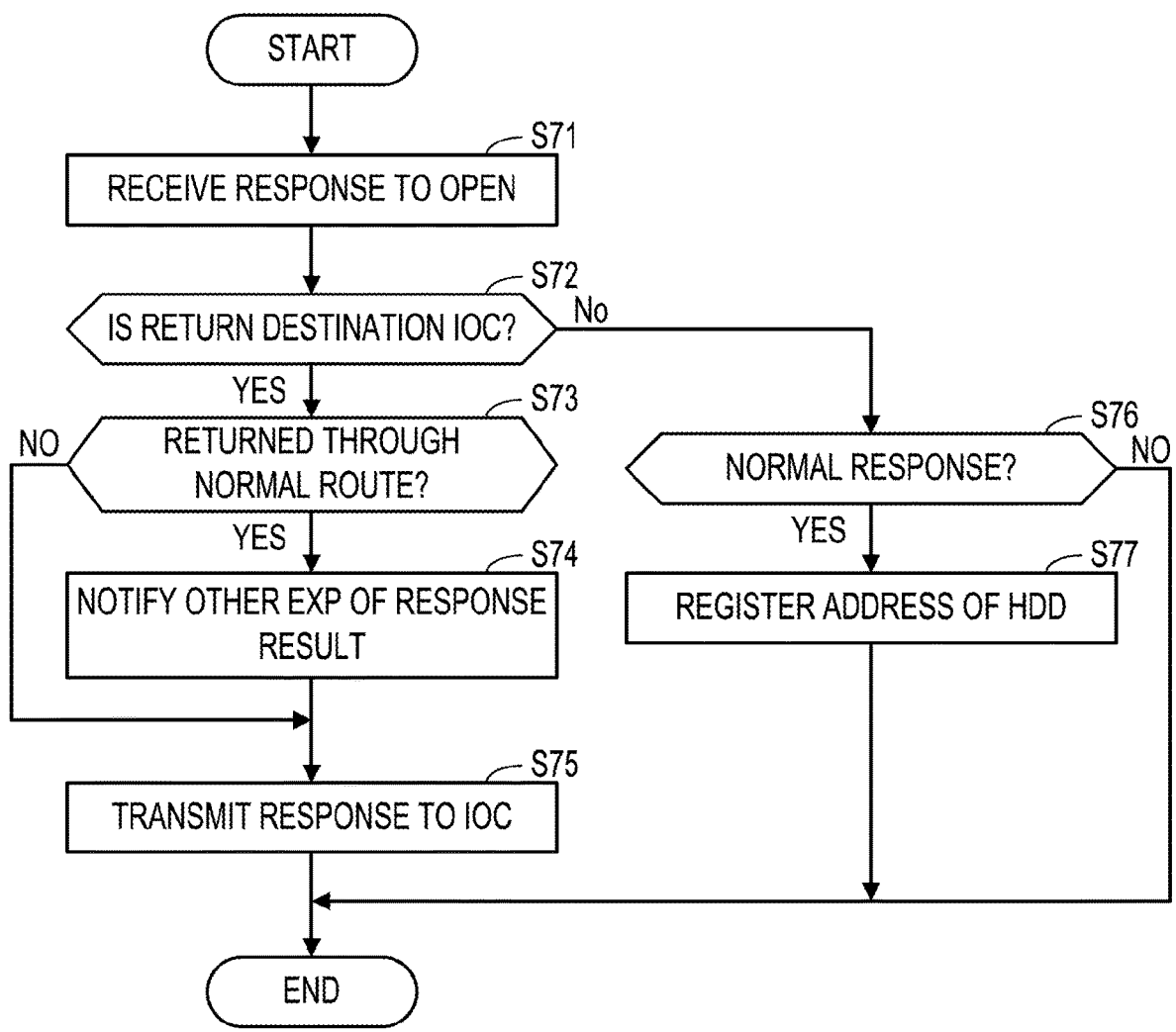
FIG. 12 is a flowchart illustrating a processing example in a case where a response message to transmission of the OPEN message is received.

FIG. 12 is a flowchart illustrating a processing example in a case where a response message to transmission of the OPEN message is received.

(Step S71) The expander receives the response message to the transmission of the OPEN message or the dummy OPEN message. Upon detecting the reception of the response message, the controller of the expander executes the processing after step S72.

(Step S72) The controller determines whether a return destination of the response message is the IOC or the expander itself. In the former case, the response message is transmitted in response to the OPEN message and in the latter case, the response message is transmitted in response to the dummy OPEN message. When the return destination is the IOC, the controller executes the processing of step S73, and when the return destination is the expander itself, the controller executes the processing of step S76.

(Step S73) Based on a reception destination of the received response message, the controller determines whether the response message is to be returned via the normal route or returned via the detour route. In the case of returning the response message via the normal route, the controller executes the processing of step S74, and in the case of returning the response message via the detour route, the controller executes the processing of step S75.

(Step S74) In this case, the request for the transmission of the dummy OPEN message to the HDD as the transmission source of the received response message is completed with respect to the other expander. In this case, the controller notifies the other expander of a response result indicated by the received response message via the communication route 230. When the received response message is the OPEN_ACCEPT message indicating a normal response, it is notified that the received response message is the normal response as the response result. Meanwhile, when the received response message indicates an abnormal response, it is notified that the received response message is the abnormal response as the response result. Further, in this case, the SAS address of the HDD as the transmission source of the response message is also notified together with the response result.

(Step S75) The controller transmits the response message received in step S71 to the IOC as the transmission destination via the switch.

When the response message is the OPEN_ACCEPT message, the communication route with the HDD as transmission source of the response message is secured at the time of step S75. Further, when "No" is determined in step S73, there is a possibility of receiving the I/O command from the IOC via the detour route after that. When receiving the I/O command via the detour route, the expander transmits the I/O command to the HDD by using the secured communication route (corresponding to step S29b in FIG. 7).

(Step S76) The controller determines whether the received response message is the OPEN_ACCEPT message indicating the normal response. When the received response message indicates the normal response, the controller executes the processing of step S77 and when the received response message indicates the abnormal response, the controller terminates the processing. Further, in the latter case, it is not possible to secure the communication route on the detour route by the dummy OPEN message.

(Step S77) When it is determined in step S76 that the response message indicates the normal response, in accordance with the transmission of the dummy OPEN message, the connection is established between the expander and the HDD as the transmission source of the response message. That is, in this state, the communication route between the expander and the HDD is temporarily secured. In this case, the controller registers the SAS address of the HDD as the transmission source of the received response message in the address management table stored in the memory.

Figure 13:
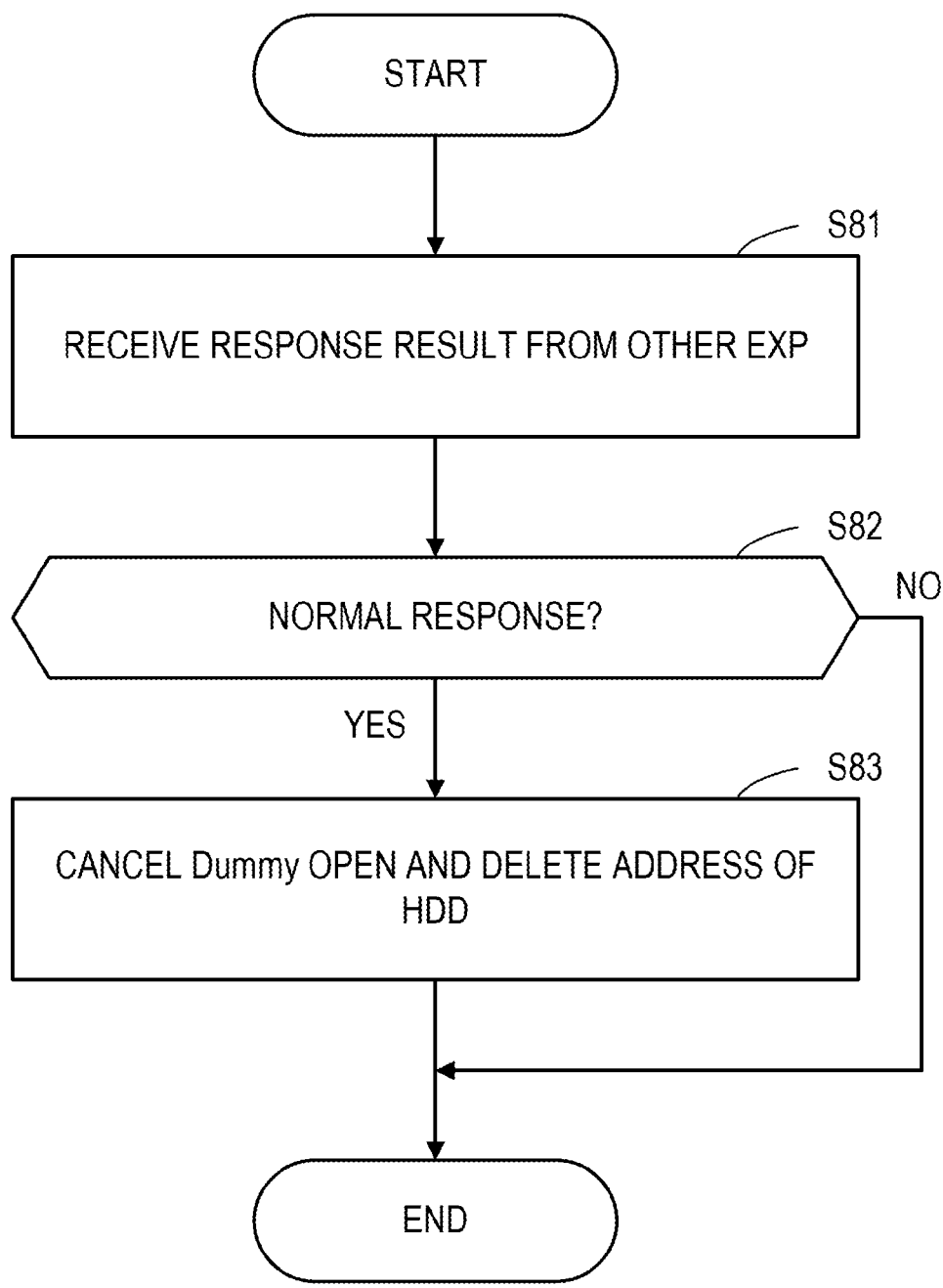
FIG. 13 is a flowchart illustrating a processing example in a case where a response result from the other expander in the same DE is received.

FIG. 13 is a flowchart illustrating a processing example in a case where a response result from the other expander in the same DE is received. Further, the processing in FIG. 13 is executed by the expander that transmits the dummy OPEN message in step S63 of FIG. 11.

(Step S81) The controller of the expander receives the response result to the OPEN message from the other expander within the same DE 200 via the communication route 230. In this case, the controller also receives the SAS address of the HDD together with the response result. For example, when the expander 220 executes the processing of FIG. 13, the expander 220 receives the response result to the OPEN message and the SAS address from the expander 210.

The reception processing is executed when the processing of step S74 in FIG. 12 is executed by the other expander.

(Step S82) The controller determines whether the response result received in step S81 indicates a normal response. When the response result indicates a normal response, the controller executes the processing of step S83, and when the response result indicates an abnormal response, the controller terminates the processing.

(Step S83) The controller executes processing for canceling the dummy OPEN message of which transmission is already completed. The transmission-completed dummy OPEN message described herein is a dummy OPEN message of which transmission is completed to the HDD indicated by the SAS address received in step S61.

Specifically, the controller releases the lock on the communication route through which the dummy OPEN message is transmitted and transmits a cancellation instruction message of the dummy OPEN message via the communication route. The transmission destination of the cancellation instruction message is the same HDD as the transmission destination of the dummy OPEN message, and the HDD is the HDD indicated by the SAS address received in step S61.

The controller deletes the SAS address of the HDD as the transmission destination of the cancellation instruction message from both the route management table and the address management table.

A case where the processing of step S83 is executed is a case where the processing of securing the connection on the normal route via the other expander is executed and the securing of the connection is successful. In this case, by executing the processing of step S83, the communication route temporarily secured on the detour route is released. The processing of step S83 is executed immediately after the other expander receives the OPEN_ACCEPT message from the HDD. Therefore, a time for temporarily securing the communication route on the detour route may be minimized, thereby enhancing the use efficiency of the communication route.

Figure 14:
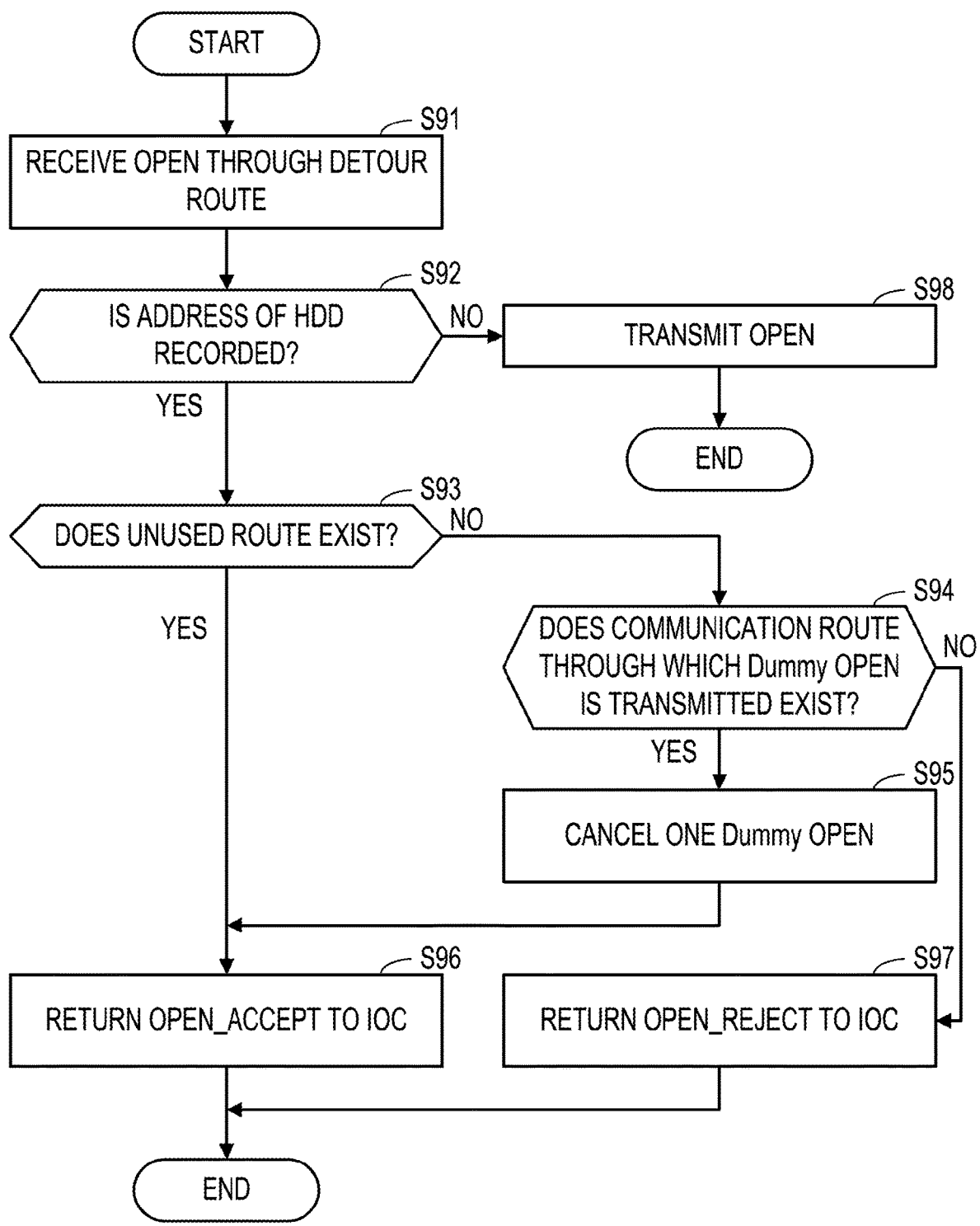
FIG. 14 is a flowchart illustrating a processing example in a case where the OPEN message is received via a detour route.

FIG. 14 is a flowchart illustrating a processing example in a case where the OPEN message is received via a detour route.

(Step S91) The expander receives the OPEN message transmitted from the IOC via the detour route. For example, when the expander 220 executes the processing of FIG. 14, the expander 220 receives the OPEN message transmitted from the IOC 116 of the CM 110. Upon detecting the reception of the OPEN message, a controller of the expander executes the processing after step S92.

(Step S92) The controller refers to the address management table stored in the memory to determine whether the SAS address of the HDD is recorded in the address management table. When the SAS address is recorded, the controller executes the processing of step S93, and when the SAS address is not recorded, the controller executes the processing of step S98.

(Steps S93 to S95) In steps S93 to S95, processings similar to steps S53 to S55 of FIG. 10 are executed. That is, the controller determines whether there is the unused communication route (step S93) and when there is the unused communication route, the controller executes the processing of step S96. Meanwhile, when there is no unused communication route, the controller determines whether there is the communication route through which the dummy OPEN message is transmitted (step S94) and when there is the corresponding communication route, the controller executes processing for canceling one dummy OPEN message of which transmission is completed (step S95). Further, when there is no corresponding communication route in step S94, the controller executes the processing of step S97.

(Step S96) The controller returns the OPEN_ACCEPT message to the IOC as the transmission source of the OPEN message received in step S91 via the switch. The OPEN_ACCEPT message is a response message indicating that the connection establishment request is accepted with respect to the received OPEN message. In addition, the controller deletes the SAS address indicating the HDD as the transmission destination of the received OPEN message from the address management table stored in the memory.

As the IOC receives the returned OPEN_ACCEPT message, the connection between the IOC and the expander is established. In this case, the connection between the expander and the HDD as the transmission destination of the OPEN message received in step S91 is already established (see step S77 in FIG. 12). For this reason, since the connection on the detour route between the IOC and the HDD is established, the IOC may transmit the I/O command to the HDD via the detour route.

The processing of step S96 corresponds to the processing of step S28 of FIG. 7. By the processing, the IOC of the transmission source of the OPEN message may receive the response to the OPEN message in a shorter time than the time when the OPEN message reaches the HDD as the reception destination and receives the response from the HDD as the reception destination. Therefore, it is possible to shorten the time from the time when the IOC transmits the OPEN message on the detour route to the time when the IOC may start transmitting the I/O command.

(Step S97) The controller returns the OPEN_REJECT message to the IOC as the transmission source of the OPEN message received in step S91 via the switch. The OPEN_REJECT message is a response message indicating that the connection with the HDD as the transmission destination of the received OPEN message may not be established.

(Step S98) The controller transmits the OPEN message received in step S91 to the HDD as the transmission destination via the switch. Further, the controller locks the communication route through which the OPEN message is transmitted and registers the SAS address of the HDD as the transmission destination of the OPEN message in the record corresponding to the locked communication route among the records of the route management table.

Although not illustrated, in practice, the same processing as the steps S93 to S95 is executed before step S98 is executed. That is, when there is an unused route at the time of starting execution of step S98, step S98 is immediately executed. Meanwhile, when there is no unused route, but there is the communication route through which the dummy OPEN is transmitted, the communication route is released and the processing of step S98 is executed using the released communication route.

The processing of the connection control devices 2a and 2b according to the first embodiment may be implemented, for example, by causing the processors installed in the connection control devices 2a and 2b, respectively, to execute programs. In addition, the processing of the expanders 210 and 220 according to the second embodiment may be implemented, for example, by causing the processors installed in the expanders 210 and 220, respectively, to execute the programs.

The programs may be recorded in a computer-readable recording medium. The computer-readable recording medium includes a magnetic memory device, an optical disk, a magneto-optical recording medium, a semiconductor memory, and the like. The magnetic memory device includes a hard disk device (HDD), a flexible disk (FD), a magnetic tape, and the like. The optical disk includes a digital versatile disc (DVD), a DVD-RAM, a compact disc read only memory (CD-ROM), a CD-recordable (R)/rewritable (RW), and the like. The magneto-optical recording medium includes a magneto optical disk (MO) and the like.

When distributing a program, for example, a portable recording medium such as the DVD or the CD-ROM in which the program is recorded is sold. Further, the program may be stored in a memory device of a server computer and the program may be transferred from the server computer to another computer via a network.

The computer that executes the program, for example, stores the program recorded in the portable recording medium or the program transferred from the server computer in the memory device thereof. In addition, the computer reads the program from the memory device thereof and executes the processing according to the program. Further, the computer may read the program directly from the portable recording medium and execute the processing according to the program. In addition, each time the program is transferred from a server computer connected via the network, the computer may sequentially execute the processing according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system, comprising:
   a first storage device including a first memory; a first connection control device coupled to the first storage device and the first connection control device including a first processor;
   a second connection control device coupled to the first storage device and the first connection control device and the second connection control device including a second processor; and
   a first main control device coupled to the first connection controller and the second connection controller and the first main control device including a third processor configured to: transmit a first connection request that requests to establish a first connection with the first storage device via a first communication route through the first connection control device;
   transmit, when the first connection is established, a first input/output request that requests input or output of data to the first storage device via the first communication route;
   transmit, when the first connection is not established, a second connection request that requests to establish a second connection with the first storage device via a second communication route through the second connection control device; and
   transmit, when the second connection is established, a second input/output request that requests input or output of data to the first storage device via the second communication route, wherein the first processor is configured to: receive the first connection request;
   transfer the first connection request to the first storage device; and
   transmit a reception notification that notifies of reception of the first connection request to the second connection control device, and the second processor is configured to: transmit a third connection request to the first storage device upon receiving the reception notification, the third connection request requesting to establish a third connection with the first storage device;
   transmit a success notification to the first main control device upon receiving the second connection request after the third connection is established, the success notification indicating that the second connection is established; and
   transfer the second input/output request to the first storage device upon receiving the second input/output request transmitted from the first main control device in response to reception of the success notification.

2. The storage system according to claim 1, wherein the second processor is configured to: store an address of the first storage device when the third connection is established, and transmit, upon receiving the second connection request, the success notification to the first main control device when a transmission destination address of the second connection request matches the stored address.

3. The storage system according to claim 1, further comprising:
   a second main control device different from the first main control device; and
   second storage devices each including a second memory, the second storage devices being different from the first storage device,
   wherein the first main control device is coupled to the second storage devices via the first communication route,
   the second main control device is coupled to the first and second storage devices via a third communication route between the second main control device and the second connection control device and a fourth communication route between the second connection control device and the first and second storage devices,
   a number of storage devices among the first and second storage devices, for which connection with the second main control device may be established in parallel via the fourth communication route, is equal to or less than a predetermined upper limit number, which is 2 or more, and
   the second processor is configured to:
   release the third connection and transfer a fourth connection request to one of the second storage devices when the fourth connection request is received from the second main control device via the third communication route before receiving the second connection request after the third connection is established and when the number of storage devices for which connection via the fourth communication route is established reaches the upper limit number, the fourth connection request requesting to establish a fourth connection with the one of the second storage devices.

4. The storage system according to claim 1, wherein the first processor is configured to:
   transmit a connection notification indicating that the first connection is established to the second connection control device when the first connection is established, and
   the second processor is configured to: release the third connection when the connection notification is received after the third connection is established.

5. The storage system according to claim 1, wherein the first processor is configured to:
   transmit the reception notification to the second connection control device via a fifth communication route different from the first communication route and the second communication route.

6. A second connection control device, comprising:
a switch configured to relay data transmitted between a first storage device and a first main control device via a second communication route;
a communication interface configured to communicate with a first connection control device that is configured to relay data transmitted between the first storage device and the first main control device via a first communication route different from the second communication route; and
a processor configured to:
receive a reception notification via the communication interface, the reception notification notifying that the first connection control device has received a first connection request from the first main control device, the first connection request requesting to establish a first connection with the first storage device via the first communication route through the first connection control device;
transmit a third connection request to the first storage device via the switch upon receiving the reception notification, the third connection request requesting to establish a third connection with the first storage device;
transmit a success notification to the first main control device via the switch upon receiving a second connection request after the third connection is established, the success notification indicating that a second connection is established, the second connection request requesting to establish the second connection with the first storage device via the second communication route; and
transfer an input/output request to the first storage device via the switch upon receiving the input/output request, the input/output request being transmitted from the first main control device in response to reception of the success notification and requesting input or output of data to the first storage device,
the second connection control device is coupled to a second main control device and second storage devices, the second main control device being different from the first main control device, the second storage devices being different from the first storage device, and
the first main control device is coupled to the second storage devices via the first communication route,
the second main control device is coupled to the first and second storage devices via a third communication route between the second main control device and the second connection control device and a fourth communication route between the second connection control device and the first and second storage devices,
a number of storage devices among the first and second storage devices, for which connection with the second main control device may be established in parallel via the fourth communication route, is equal to or less than a predetermined upper limit number, which is 2 or more, and
the processor is configured to:
release the third connection and transfer a fourth connection request to one of the second storage devices when the fourth connection request is received from the second main control device via the third communication route before receiving the second connection request after the third connection is established and when the number of storage devices for which connection via the fourth communication route is established reaches the upper limit number, the fourth connection request requesting to establish a fourth connection with the one of the second storage devices.

7. The second connection control device according to claim 6, wherein the processor is configured to: store an address of the first storage device when the third connection is established, and transmit, upon receiving the second connection request, the success notification to the first main control device when a transmission destination address of the second connection request matches the stored address.

8. The second connection control device according to claim 6, wherein the processor is configured to: release the third connection when a connection notification is received from the first connection control device after the third connection is established, the connection notification indicating that the first connection is established.

9. A non-transitory computer-readable recording medium having stored therein a program that causes a computer to execute a process, the process comprising:
receiving a reception notification that notifies that a first connection control device has received a first connection request from a first main control device, the first connection request requesting to establish a first connection with a first storage device via a first communication route through the first connection control device;
transmitting a third connection request to the first storage device upon receiving the reception notification, the third connection request requesting to establish a third connection with the first storage device;
transmitting a success notification to the first main control device upon receiving a second connection request after the third connection is established, the success notification indicating that a second connection is established, the second connection request requesting to establish the second connection with the first storage device via a second communication route different from the first communication route; and
transferring an input/output request to the first storage device upon receiving the input/output request, the input/output request being transmitted from the first main control device in response to reception of the success notification and requesting input or output of data to the first storage device,
the second connection control device is coupled to a second main control device and second storage devices, the second main control device being different from the first main control device, the second storage devices being different from the first storage device, and
the first main control device is coupled to the second storage devices via the first communication route,
the second main control device is coupled to the first and second storage devices via a third communication route between the second main control device and the second connection control device and a fourth communication route between the second connection control device and the first and second storage devices,
a number of storage devices among the first and second storage devices, for which connection with the second main control device may be established in parallel via the fourth communication route, is equal to or less than a predetermined upper limit number, which is 2 or more, and
the processor is configured to:
release the third connection and transfer a fourth connection request to one of the second storage devices when the fourth connection request is received from the second main control device via the third communication route before receiving the second connection request after the third connection is established and when the number of storage devices for which connection via the fourth communication route is established reaches the upper limit number, the fourth connection request requesting to establish a fourth connection with the one of the second storage devices.

\* \* \* \* \*